(12) United States Patent
Schuessler et al.

(10) Patent No.: US 6,726,104 B2
(45) Date of Patent: Apr. 27, 2004

(54) SCALING TECHNIQUES FOR PRINTING BAR CODE SYMBOLS

(75) Inventors: Frederick Schuessler, Baiting Hollow, NY (US); Anne Schuessler, Baiting Hollow, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 275 days.

(21) Appl. No.: 10/013,991

(22) Filed: Dec. 10, 2001

(65) Prior Publication Data

US 2002/0113125 A1 Aug. 22, 2002

Related U.S. Application Data

(60) Provisional application No. 60/256,266, filed on Dec. 18, 2000, provisional application No. 60/259,747, filed on Jan. 4, 2001, provisional application No. 60/260,549, filed on Jan. 8, 2001, and provisional application No. 60/268,501, filed on Feb. 13, 2001.

(51) Int. Cl.[7] ................................................. G06K 7/10
(52) U.S. Cl. ........................... 235/462.09; 235/462.01; 235/462.08; 235/462.16
(58) Field of Search ....................... 235/462.01, 462.02, 235/462.08, 462.09, 462.16, 494, 460, 462.1

(56) References Cited

U.S. PATENT DOCUMENTS

| | | | | |
|---|---|---|---|---|
| 4,883,377 A | * | 11/1989 | Takeda | 400/124.07 |
| 5,183,343 A | * | 2/1993 | Tazawa et al. | 235/463 |
| 5,449,895 A | * | 9/1995 | Hecht et al. | 235/494 |
| 5,521,372 A | * | 5/1996 | Hecht et al. | 235/494 |
| 5,564,841 A | * | 10/1996 | Austin et al. | 400/103 |
| 5,835,615 A | * | 11/1998 | Lubow et al. | 235/494 |
| 5,866,895 A | * | 2/1999 | Fukuda et al. | 235/494 |
| 6,116,507 A | * | 9/2000 | Fukuda et al. | 235/454 |
| 6,131,807 A | * | 10/2000 | Fukuda et al. | 235/494 |
| 6,182,901 B1 | * | 2/2001 | Hecht et al. | 235/494 |
| 6,446,866 B1 | * | 9/2002 | Tatsuta | 235/454 |
| 6,493,110 B1 | * | 12/2002 | Roberts | 235/462.01 |

FOREIGN PATENT DOCUMENTS

| | | | | |
|---|---|---|---|---|
| JP | 2001001616 A | * | 1/2001 | B41J/29/46 |
| WO | WO 9948037 A1 | * | 9/1999 | G06K/1/12 |

OTHER PUBLICATIONS

Bar Code Error Correction, Jun. 1983, IBM Technical Disclosure Bulletin, vol. 26, Issue 1, pp. 14 150.*

* cited by examiner

Primary Examiner—Thien M. Le
Assistant Examiner—Uyen-Chau N. Le

(57) ABSTRACT

A method of producing a digital image of a machine readable optical code symbol having areas of different spectral characteristics and which is printable on differing printers having differing dot pitches. A desired nominal unit dimension is selected for each area of the optical code symbol; a resulting nominal unit dimension for each area is defined as a function of the dot pitch of a target printer; and a vector representation of the optical code symbol is provided using the resulting nominal unit dimension.

40 Claims, 7 Drawing Sheets

No scaling of image

Image stretched in height, but not in width:

Image moderately stretched (by 25%), in width only:

Image greatly scaled in both axes:

Image slightly reduced (by 25%) in both axes:

Image greatly reduced in both axes:

C128e.eps:
 Xdimension Requested: 10mils
PrintGainAdj Requested: 0 X

1234567890

C128e.eps:
 Xdimension Requested: 10mils
PrintGainAdj Requested: 1/3 X

1234567890

C128e.eps:
 Xdimension Requested: 10mils
PrintGainAdj Requested: NEGATIVE 1/3 X

1234567890

C128e.eps:
 Xdimension Requested: 15mils
PrintGainAdj Requested: 0.5 X

1234567890

C128e.eps:
 Xdimension Requested: 13.33mils
PrintGainAdj Requested: 0.5 X

1234567890

C128e.eps:
 Xdimension Requested: 10mils
PrintGainAdj Requested: 0 X

C128e.eps:
 Xdimension Requested: 10mils
PrintGainAdj Requested: 1/3 X

C128e.eps:
 Xdimension Requested: 10mils
PrintGainAdj Requested: NEGATIVE 1/3 X

C128e.eps:
 Xdimension Requested: 15mils
PrintGainAdj Requested: 0.5 X

C128e.eps:
 Xdimension Requested: 13.33mils
PrintGainAdj Requested: 0.5 X dottest.eps:
Requested X dimension: 15 mils
Adjusted using HWResolution entry in currentpagedevice dictionary dottest.eps:
Requested X dimension: 15 mils
Adjusted using HWResolution entry in currentpagedevice dictionary No scaling of image Image stretched in height, but not in width:

Image moderately stretched (by 25%), in width only:

Image greatly scaled in both axes:

Image slightly reduced (by 25%) in both axes:

Image greatly reduced in both axes:

No Scaling:

Stretched in Y axis, but not in X axis:

Stretched in X axis by 20%, but not Y:

Stretched equally in X and Y, but beyond the 15 mil limit:

Shrunk equally in X and Y down to 50%, below the 6mil limit:

1234567890

1234567890

SCALING TECHNIQUES FOR PRINTING BAR CODE SYMBOLS

CROSS-REFERENCE(S) TO RELATED APPLICATIONS

The present invention claims priority under 35 U.S.C. §119 to provisional applications Serial Nos. 60/256,266, filed on Dec. 18, 2000, 60/259,747, filed on Jan. 4, 2001, 60/260,549, filed on Jan. 8, 2001, and 60/268,501, filed on Feb. 13, 2001.

FIELD OF THE INVENTION

The present invention relates to a method for representing a digital image of a bar code or matrix code in a vector format, that automatically adjusts its critical dimensions to correctly match the dot spacings of different printers and that allows various graphical parameters of the bar code image to be safely changed after the image is encoded.

BACKGROUND OF THE INVENTION

Ever since the 1960's, and especially since the advent of the Universal Product Code in the 1970's, bar code symbols have been widely adopted as the most popular form of optical marking for machine recognition of printed information. It has proved to be substantially more reliable than Optical Character Recognition (OCR) technology, primarily because (unlike printed letters and numbers) the bar-and-space "languages" represented in bar codes were designed "from the ground up" to be easily discriminated by machine, even in the presence of some degree of printing and scanning defects. Several barcode "languages," called "symbologies" have been developed, each with its advantages for certain applications. One characteristic that they all have in common, is that the bars and spaces are varied in their widths, to form predefined patterns that actually carry the information. Moreover, these widths are not continuously variable (like the set of real numbers). Instead, they are quantized into a small set of allowed nominal widths, measurably different from each other, so that the reading machine (i.e. scanner) can pick the nearest ideal width which is the best fit to the imprecise signals that are received when light is reflected from an imperfectly-printed symbol. It is very important that the reading system can unequivocally determine which widths were intended to be printed. A single mistake in this regard will result in failure to decode the barcode, and worse, multiple mistakes can result in an erroneous interpretation of the encoded data.

Although not all bar code symbologies use the same set of allowed widths (nor would that restriction apply to the current invention), it is simplest for explanatory purposes to consider a typical class of bar code symbologies called (n,k) codes, where the bar code is typically constructed of a series of patterns, each pattern usually representing one or two data characters, and each pattern made up of a small number of bars and spaces of predefined relative widths. For example, in barcodes of the Code 128 symbology, each of these bars and each of these spaces must be chosen from one of four relative widths. The unit width (by definition, the narrowest bar or space allowed) is called a module. All of the bars and all of the spaces within a Code 128 symbol are nominally either 1, 2, 3, or 4 modules wide; no other widths are defined. The absolute width of a module is not a fixed dimension across all Code 128 symbols, but can be chosen at the time of printing. The typical width of a printed module ranges from 0.005 inch to 0.040 inch (but is fixed at one size, within any one printed symbol). Other symbologies, such as Code 39, utilize only two different allowed widths ("wide" and "narrow") for the bars and spaces. The wide elements are not necessarily an integer multiple of the narrow elements (for example, the wide bars and spaces can be chosen to be 2.5 times the width of the narrow bars and spaces). One skilled in the art would recognize that such symbologies can also benefit from the techniques of the present invention.

Since the typical bar code reading device can operate over a wide range of distances from the bar coded paper or package, the decode algorithms in the reader do not attempt to estimate the actual sizes of the bars and spaces (they will appear smaller, the further the reader gets from the paper). Instead, the decode algorithms attempt to judge the relative (not absolute) widths of these elements. As an example, the Code 128 symbology uses a set of 108 different patterns, and each pattern is comprised of three bars and three interleaved spaces which always have a total width (across those six elements) of eleven modules. Thus, the decode algorithm (in greatly simplified form) can look at a group of three bar and three space measurements from the scanner, calculate that total width, assume that this represents eleven modules, and then judge whether each bar or space is closest to $1/11$, $2/11$, $3/11$, or $4/11$ of that total width. In actuality, the decode algorithm estimates the widths of adjacent bar/space pairs, rather than single bars or spaces, because this approach is more immune to a phenomenon called uniform ink spread. It can be seen that the actual size of a printed module is irrelevant to the decoder, but the relative widths must be fairly close to the ideal ratios of 1:2:3:4. Some error is tolerated, because if a bar whose nominal width was 3 modules is accidentally printed as 3.25 modules, the decoder will still correctly round-off to the nearest allowed width of 3. Should that error exceed half a module, on the other hand, a reading failure will occur. This error tolerance must be shared between printing inaccuracies and scanning signal inaccuracies (the scanner may be too far away and somewhat out of focus, for example). Thus, the more accurately the relative widths of the bar code are printed, the more likely the system will still work despite a poor scanner signal (due to operator error, electrical or optical noise, or other factors).

Naturally, it is usually desired for bar codes to be printed in as small an area as is possible (for instance, to leave more room for other graphics and text). This is done by printing at the smallest nominal module size that is still within the capabilities of the printer to print accurately, and within the capabilities of the scanner to scan accurately. From the printing perspective, the lower limit on printed module size is somewhat dependent on the roughness of the paper and characteristics of the ink, but it depends primarily on the dot spacing of the printing device. The narrowest bar that any printer can print is, by definition, one dot wide, but the width of a single column of dots varies too much to be an accurate unit width. The standard rule of thumb is that the unit module width must be at least two dots wide, and a minimum of three dots wide is recommended. Since different printers have different dot spaces (commonly measured in dots per inch or DPI), a three-dot-wide unit module will be different physical sizes on different printers. The printing technologies that print bar codes vary by more than an order of magnitude in their DPI resolution, from 200 DPI (inexpensive thermal printers that generate small labels) to 4000 DPI (high-resolution printing presses for magazines and other high-quality print jobs).

The foregoing discussion indicates why, in the current state of the art, it has always been important to ascertain the intended printing resolution before generating a digital bar code image. This is because no printer can place a dot half way between the imaginary grid points that define that printer's dot pitch. If, for example, a bar code will be printed on a 300 DPI printer (typical of many ink jet and laser printers), a three-dot-wide bar will be nominally 3/300 of an inch wide (i.e., 1/100, or 0.010 inch). A four-dot-wide bar will be 0.0133 inch wide, and a five-dot-wide bar will be 0.0167 inch wide. Note, however, that a 0.015 inch width cannot be accurately printed on a 300 dpi printer, because that width "falls between the dots" of the printer's imaginary grid. A 400 dpi printer can accurately print that width in 6 dots, and a 600 dpi printer can do it accurately in 9 dots, but the image of a barcode with a 0.015 module width will inevitably be rendered quite inaccurately if sent to a 300 dpi printer. In fact, the widths of the narrow bars will (usually randomly) be a mix of 0.0133 and 0.0167 inch wide (but none can be 0.015), and the larger bars and spaces will be similarly "off" by plus or minus half a dot or more. This problem can be magnified by the relative-measurement approach of the decode algorithm. For example, a given interior measurement (a bar/space pair) could be almost 2 dots too narrow (if the left edge is moved to the right, and the right edge is moved to the left), while the overall character-pattern width could be almost 2 dots too wide, making the relative size of the interior measurement even more narrow (and most likely, causing a decoding failure).

For this reason, competent bar code generation programs (called "encoders") have always required, as an input to the process, the expected printer resolution in dpi. In fact, these programs most often prohibit selection of a nominal module width that cannot be accurately matched to the dot pitch of the printer (in the above example, if 300 dpi were selected, then a nominal module width of 0.015 inch would not be an allowed choice).

Unfortunately, once a bar code image has been generated for one printer resolution, nothing prevents that image from being embedded in a larger document and eventually sent (out of ignorance or carelessness) to a printer of an incompatible resolution. No matter how accurate the original image was, for the intended printer, this image will make an inaccurate barcode on a printer whose dot pitch cannot exactly reproduce the intended dimensions. Especially when a bar code is added to an advertisement for a newspaper or magazine, it would be inherently difficult for the advertising agency to produce different versions of that ad to match the different printing presses used by different publishers who will incorporate that ad in their publications. Most likely, the same ad copy will find its way to all the printing presses, and the resulting bar code will be somewhat inaccurate on most of them.

It should be noted that an equivalent problem occurs when printing a two-dimensional matrix code to a printer at a mismatched resolution. In the case of a matrix code, the data is encoded in regular polygons (squares, rectangles, hexagons, or even round dots), where a polygon's area is either printed or left unprinted to represent one bit of information at the graphical level. These codes are scanned by readers that form a two-dimensional image and then decode that image by determining the overall relative scale of the matrix code from non-data patterns that are predetermined features of the code, then determining the ideal locations of the data polygons within the image, and then determining if each such location was printed or unprinted. In this case, accurate placement of the predetermined features, and of the individual data polygons, is important. If the matrix code's polygon-placement grid cannot be mapped to an integer number of printer dots, then errors in the centering of these polygons will occur, to the detriment of reading performance.

It is a common misconception that representing a bar code or matrix code image using a vector format, rather than a bitmap format, automatically solves this problem. In publishing, individual machine-generated images (including line art, and bar codes as well) are usually represented in vector format. As one example, Hewlett-Packard (HP) has developed a vector-graphics language called PCL, which is how a PC can translate a document into a set of drawing commands for an HP printer. Another popular vector image file format has been devised by Adobe, known as Encapsulated PostScript Format (or EPSF). This format can represent images as a series of primitive drawing commands, drawing a line between two points, or filling a circle or "painting" text characters on an imaginary page grid of infinite resolution. However, when a set of "drawing instructions" is executed for a specific printer, the resulting physically-inked points are still limited to the dot spacing of that printer. Thus a vector command to draw a rectangle 0.015 inch wide will still result in an inaccurate bar, if sent to a 300 dpi printer.

It is believed that all available bar code generation programs generate vector image files that, once embedded in a larger document, can be arbitrarily scaled and distorted at will by the operator of a word processor or page-layout program. This usually results in a mismatch between bar code dimensions and printer dot pitch, and can also result in a bar code that may be either too small or too large for a scanner to read.

It is also believed that all available bar code generation programs generate a vector image file that, when sent to a printer of an inappropriate dot pitch, will be rendered as a bar code with the correct overall (end-to-end) width, but where many of the individual bars and spaces will be either too wide or too narrow compared to nominal dimensions. This can result in a bar code that does not scan or scans incorrectly.

The printing problems described above are in general due to a mismatch between the ideal dimensions of a bar code and the dot pitch of the printer. These problems are often exacerbated by intentional or accidental scaling of the bar code image, once it has been embedded in a word processing file or a page-layout file. The user of the page-layout program is often tempted to "stretch" or "shrink" the bar code image to make it fit better on the page. Although this is a useful operation when applied to a typical pictorial image, it is very likely to result in bar code dimensions that do not match the dot pitch of the printer, even if the image was a correct match when originally created.

It is an object of the present invention to provide an improved method for representing a vector-graphic image of a linear or two-dimensional machine-readable symbol, which can be rendered accurately on printers of any dot pitch.

It is another object of the present invention to provide an improved method for representing a vector-graphic image of a linear or two-dimensional machine-readable symbol, so that an accurate digital image can be created without advance knowledge of the dot spacing of the printer that will be used to print the image.

It is a further object of the present invention to provide an improved method for representing a vector-graphic image of a linear or two-dimensional machine-readable symbol, which, when this image is sent to a printer or to a Raster Image Processor for rendering at a specific dot pitch, automatically adjusts the width of the nominal module size of the barcode depicted in the image to be an integer number of dots.

Another object of the present invention is to provide an improved method for representing a vector-graphic image of a linear or two-dimensional machine-readable symbol, which, when this image is sent to a printer or to a Raster Image Processor for rendering at a specific dot pitch, automatically adjusts the width of the nominal module size of the barcode depicted in the image to be an appropriate number of dots, taking a possible rotation of the image into account.

A further object of the present invention is to provide an improved method for representing a vector-graphic image of a linear machine-readable symbol, which, when this image is sent to a printer or to a Raster Image Processor for rendering at a specific dot pitch, automatically adjusts the height of the bars of the barcode depicted in the image to be an integer number of dots.

A still further object of the present invention is to provide an improved method for representing a vector-graphic image of a "stacked" two-dimensional machine-readable symbol (such as PDF417), which, when this image is sent to a printer or to a Raster Image Processor for rendering at a specific dot pitch, automatically adjusts the height of each row of bars of the barcode depicted in the image to be an integer number of dots.

Still another object of the present invention is to provide an improved method for representing a vector-graphic image of a "matrix" two-dimensional machine-readable symbol (such as Data Matrix), which, when this image is sent to a printer or to a Raster Image Processor for rendering at a specific dot pitch, automatically adjusts the height of the modules of the barcode depicted in the image to be an integer number of dots.

Another object of the present invention is to provide an improved method for representing a vector-graphic image of a linear or two-dimensional machine-readable symbol, which, when this image is sent to a printer or to a Raster Image Processor for rendering at a specific dot pitch, automatically adjusts the amount of print-gain compensation (in either the X or Y dimension, or both) in the barcode depicted in the image to be an integer number of dots.

An object of the present invention is to provide an improved method for representing a vector-graphic image of a linear or two-dimensional machine-readable symbol, which (once embedded in a larger document file) can control the extent to which the printed image may be scaled, and when this document is sent to a printer or to a Raster Image Processor for rendering at a specific dot pitch, automatically adjusts the width of each of the critical parameters of the scaled image (such as nominal module width and height, and amount of print-gain compensation) to be an integer number of dots.

It is another object of the present invention to provide an improved method for representing a vector-graphic image of a linear or two-dimensional machine-readable symbol, which allows a user to safely alter various graphical parameters of the image, without needing to re-encode the symbol, and without needing access to a program that is capable of encoding symbols of the represented symbology.

Many industrial-use printers (available from vendors such as Zebra and Intermec) contain their own bar code generation algorithms. Since the bar code generation is inherently performed for a single printer resolution, these printers are not relevant to the current invention. Numerous commercial software programs are currently being marketed that can generate a digital image of a barcode for an external printer. Sometimes the bar code encoding function is part of a label-generation package, such as CodeSoft, from Teklynx. When adding a bar code image to a CodeSoft label, the CodeSoft program requires, as input, how many printer dots should make up a narrow bar. Once set, this value can only be changed by re-entering the program, and cannot be varied automatically if the same label file is sent to a different printer. Thus, such a program does not achieve the goals of the present invention. Other programs can output bar code images in a wide variety of bitmapped file formats (creating files with .bmp and .tif extensions, for example) and vector-graphic file formats (creating files with .eps extensions, for example). One example is the program called Bar Code Pro, from SNX (formerly Synex, of Brooklyn, N.Y.). This program operates by taking a specified printer dpi as input, and then provides a list of only the nominal module sizes that are accurately supported by that dpi. However, when the resulting eps graphics file is printed on a printer of lower resolution, the result is an image that is the correct overall size, but where the individual bars and spaces are randomly too large or small, due to round-off error in translating from an ideal width to an integer number of dots.

SUMMARY OF THE INVENTION(S)

These and other objects of the present invention are achieved by a method according to the present invention for producing a digital image of a machine readable optical code symbol having areas of different spectral characteristics and which is printable on differing printers having differing dot pitches in which the code symbol is represented in a format that automatically causes the RIP to reduce the overall width if necessary, so that nominal module width becomes an exact integer number of dots wide for each printer used, without any modification to the image file itself, nor to the document file containing the image.

In one embodiment of a method according to the invention, a desired nominal unit dimension for each area of the optical code symbol is selected, a resulting nominal unit dimension for each area is defined as a function of the dot pitch of a target printer; and a vector representation of the optical code symbol using the resulting nominal unit dimension is provided.

In another embodiment of the invention, the method also includes selecting a desired nominal starting position for each successive area of the optical code symbol, defining a resulting nominal starting position for each successive area as a function of the dot pitch of a target printer; and providing a vector representation of the optical code symbol using the resulting nominal unit dimension and the resulting nominal starting positions.

In a further embodiment of the present invention, the method of producing a digital image of a machine readable optical code symbol having areas of different spectral characteristics and which is printable on differing printers having differing dot pitches, comprises selecting a desired nominal starting position for each successive area of the optical code symbol, defining a resulting nominal starting position for each successive area as a function of the dot pitch of a target printer and providing a vector representation of the optical code symbol using the resulting nominal starting positions.

In each of the embodiments, preferably, the optical code symbol is a bar code having bars and spaces of varying widths and more preferably the bar code is an n,k bar code and wherein the nominal unit dimension is a module width and in a particularly advantageous commercial embodiment, the n,k bar code is an 11,3 bar code wherein the bars and spaces are from 1 to 4 modules in length. Alternatively, the code symbol can be a two-dimensional code symbol, preferably an n,k bar code and wherein the nominal unit dimension is at least one of the X dimension and the Y dimension and most preferably PDF417.

The code symbol image file can be embedded into another electronic document. Controls can be included in the image file to limit the scaling of the image to predefined limits, to specify an amount print gain adjustment to be applied to compensate for ink spread, and to specify an amount of unprinted border area adjacent to the code symbol when printed.

These and other features and advantages of the present invention will become more apparent from the following detailed description taken with the attached drawings, wherein:

DETAILED DESCRIPTION OF THE INVENTION

Figure 1:
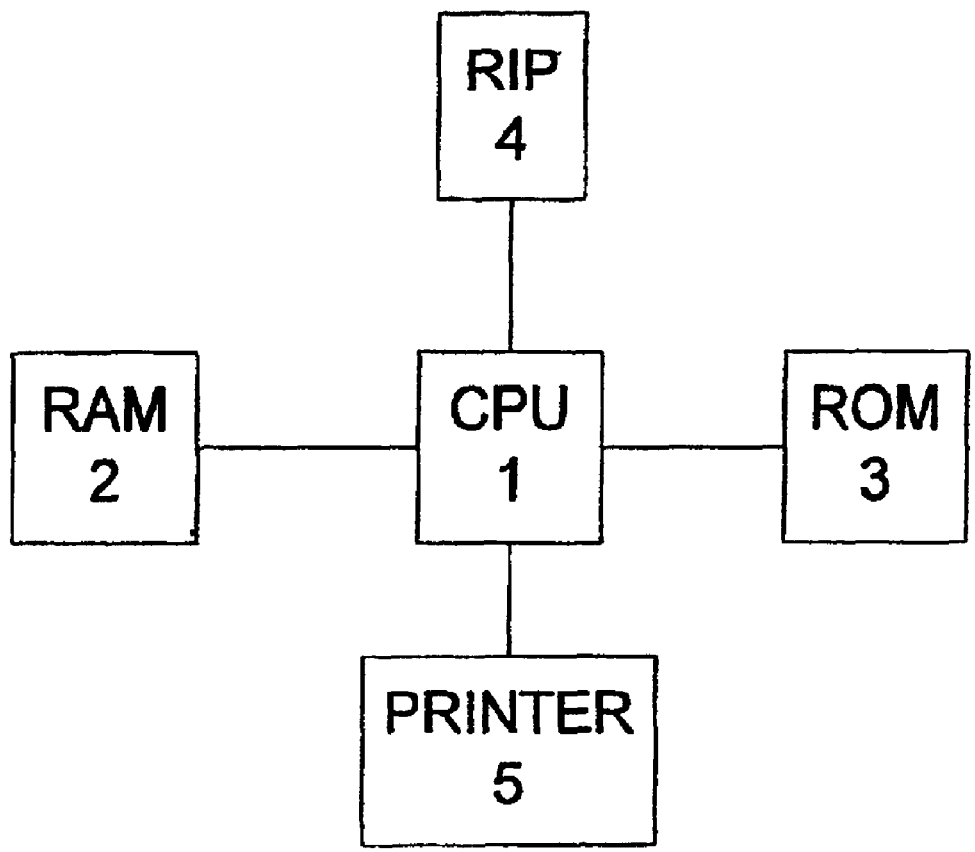
FIG. 1 is a block diagram of a system for carrying out the methods of the present invention.

The invention comprises a system for creating bar coded labels, packaging, advertisements, coupons, catalogs, or other documents. The system, as shown in FIG. 1, comprises the following elements, which are typically not all physically connected, nor need they operate concurrently in time:

1) a Central Processing Unit (CPU) 1, such as a personal computer, workstation, or mainframe computer;
2) an encoding program stored in RAM 2 or ROM 3, executing on a CPU, which can generate a bar code symbols (of any one-dimensional or two-dimensional bar code symbology or matrix symbology) as a vector-graphics image. This image can sent immediately to a printer 5, or can be saved to disk as a separate file in any format (such as Adobe EPSF) that can be "interpreted" at a later time to create a rasterized bitmap image, tailored (at that later time) to map directly to the dot spaces of a particular printer.
3) Optionally, a word processing or desktop publishing program stored in RAM 2. The vector image generated by the encoding program can be inserted (immediately from RAM, or later from a saved image file) into a larger electronic document (such as would represent an advertisement or catalog), which larger document would be created using a word processing program such as Microsoft Word or a publishing program such as QuarkXpress. The only requirement is that the vector commands be preserved for execution at the time the file is actually rasterized for the intended printer. As an optional configuration, the encoding program can be implemented as a "plug-in" or "extension", adding bar code generation functionality to the word processing or desktop publishing program.
4) A Raster Image Processor (RIP) 4. This is a standard hardware or software component that takes as input a vector representation of pages to be printed (which would include the vector representation of one or more bar codes, generated according to the present invention), and generates a rasterized image (i.e. a bit map) that is a direct representation of which dots on the page should be printed. This RIP function can take many forms. For example, it could be located within a printer or printing press, on the CPU connected to a printing press, or as a "print driver" (such as a PostScript driver) on the personal computer or workstation where the encoding program and/or the publishing program is located. The output of the RIP can be saved to disk, or can drive the operation of the printer directly.
5) A printer or printing press 5. This can be any form of industrial, office, or home printer (such as dot matrix, inkjet, thermal, or laser), or could be a printing press using any common press technology (such as rotogravure, offset lithography, flexography, or a digital press).

A key feature of this system, compared to prior systems known in the art, is its ability to generate a bar code image that can automatically adapt itself to the dot spacing of different printers. The way this is achieved is through a novel implementation of a vector description of a bar code. The typical vector description of a bar code attempts to draw filled rectangles (bars) of specific absolute dimensions and specific relative locations (for example, relative to a corner of the page, or placing the bars at specific positions relative to the leftmost bar). These locations may not correspond to any physical dot location that can be printed by a given printer, and so the RIP will (fairly arbitrarily) round these "impossible" locations to the nearest dot location, resulting in inaccurate bar widths, but resulting in an overall image of the correct size.

Instead, the vector representation of the present invention achieves accurate results regardless of the printer's dot spacing, due to a combination of novel techniques. First, the present invention bases every drawing command on multiples of a nominal bar width which (when these commands are executed by the RIP) has been adjusted automatically to exactly match the dot pitch of the target printer. Second, the vector representation of the current invention uses the "adjusted" location of each bar or space (as has been modified by the RIP to fit the current printer) to redefine the starting location of the next bar or space to be drawn. Thus, cumulative errors are avoided, and the overall size of the image is adjusted to be the size required at the adjusted nominal bar width.

To accomplish these adjustments, neither the vector image file, nor the document containing it, need to be modified (not even automatically); instead it is the RIP, when interpreting this novel sequence of vector commands, that automatically makes the adjustment. Note that modifications to a standard RIP are not required in order to implement this new functionality. Any current PostScript printer driver, or any other RIP that can process a PostScript page description file, is able, without modification, to process images created according to the method disclosed herein. The same would be true of any RIP capable of processing an HP PCL description of the bar code image, if the image file were written in PCL, using PCL programming constructs that perform the equivalent functions to those shown in the PostScript examples described below.

Table 1 shows the complete contents of a sample EPSF image file, called "C128e.eps", constructed according to the present invention, that represents the image of a Code 128 symbol encoding the data "1234567890". FIG. 1 shows one way that an automatically-adjusted bar code image can be created, using the PostScript programming language developed by Adobe. FIG. 1 shows a complete EPSF file that will generate a Code 128 symbol, and that will automatically adjust its own size when rasterized to a given dot pitch.

Lines 1 through 12 consist of standard EPSF commands (some required in every EPSF file), which will be readily understood by anyone conversant with PostScript programming. Line 13, is a standard PostScript "idiom" (adapted from page 120 of the *PostScript Language Reference, third edition*). This line of code defines a "snap" routine, which takes the current (x,y) coordinates in abstract PostScript "user space", and returns a revised set of user space coordinates that exactly map to the nearest dot location in the PostScript representation of printer "device space". More specifically, since device coordinates are defined as the lower left corner of a device pixel, not its center, this "snap" routine maps to a point a quarter-dot inward from that corner towards the center, so that subsequent minor math roundoff errors will not cause a shift to an adjacent dot. This idiom, well known in the art, and used by at least some current bar code encoding programs, does not by itself solve the problems addressed by the present invention. Using the previous example, attempting to print a 15 mil bar to a 300 dpi printer, a 4.5-dot-wide bar is required, but cannot be printed. Even using this "snap" routine, standard practice still results in a bar that (although an exact number of dots wide) is inevitably either a half-dot too narrow or a half-dot too wide. The only way to obtain truly accurate printing in this example is to acknowledge that the 15 mil X dimension cannot be achieved on this printer, and therefore the X dimension must be changed (for example, to a 4-dot-wide bar, which would be 13.333 mils wide, not 15.

Line 19 accomplishes this change of X dimension automatically, only when needed, and in a fashion that never makes the resulting bar code too large to fit in its allotted space. This automatic adjustment of the X dimension, to fit an exact number of dots on the active print device, is accomplished on Line 19, using the "truncdot" routine defined on line 14. "Truncdot" takes as input user-space (x,y) coordinates and returns revised user-space coordinates representing a distance along the X axis that has been adjusted down to the nearest smaller number of dots (unlike "snap", which may round up or down). Line 19 therefore defines an X dimension, in user coordinates, which is guaranteed to be an integer number of pixels on every printer that these commands are sent to. Note that, if a two-dimensional machine-readable symbol were to be depicted using the present invention, then an additional line of Postscript code would be added, similar to line 19, but setting a nominal unit height (for the bars, for the rows, or for the height of the matrix, depending on symbology). As an example:

/Ydim 26.667 0.072100 mul 0 exch truncdot exch pop def would set Ydim as nominally 26.667 mils, but this unit-height dimension would be automatically rounded down to an integer number of dots for the current print device.

Line 20 similarly sets the ink-spread compensation to be an integer number of dots (possibly rounding down to 0 compensation, if the printer resolution is too low). Note that, if a two-dimensional machine-readable symbol were to be depicted using the present invention, then an additional line of Postscript code would be added, similar to line 20, but setting a second amount of ink-spread compensation for the Y axis, based on the nominal unit height.

Lines 20 through 29 define the important drawing parameters of the bar code as multiples of the printer-adjusted X dimension, so that they also will be accurately matched to the printer.

Lines 30 through 37 define the routines for drawing bars of the nominal widths (1, 2, 3, or 4 modules wide), but allowing for the right edge of every bar to be shifted to the left or right, reducing the overall width of that bar by the "printgainadj" amount (or increasing the overall width, if "printgainadj" is set in a modified line 24 to be a negative number). So long as the same edge (left or right) of every bar is adjusted by the same amount, the decode algorithm (which looks at bar/space pairs, not single elements) is unaffected, but excessive ink spread is avoided. Note also that bottom edge of a multiple-width bar (a 2, 3, or 4 module bar) is drawn in multiple steps, in increments of one module that are snapped to a printer dot location at every step, and the use of "currentpoint" obtains the adjusted location, aligned to a printer dot, as the adjusted starting point for the next step. This avoids any possibility of cumulative rounding error, and ensures that the target locations of every bar and space edge are properly aligned to printer dots, at the correct width increments (based on the number of dots per nominal module width). Note finally that a variable called "leftpoint" is utilized, so that after each bar has been drawn, the current drawing point is positioned on an exact module boundary, even though the right edge of the bar may have been deliberately drawn slightly to the left or right of that boundary (depending on the value of "printgainadj").

Lines 38 through 41 define the method for creating 1X, 2X, 3X, and 4X spaces. Since no graphical element actually needs to be drawn to create a space, these routines are less complex than the bar routines. Again, though, a multiple-module space is created in discrete steps, in order to avoid any possibility of cumulative rounding error.

The initial drawing point is set by lines 24 and 25. Line 24 ensures that the starting point leaves room for the 10X left Quiet Zone (large space) that Code 128 symbols require.

The eight Code 128 symbol character patterns (each consisting of 3 bars and 3 interleaved spaces) are actually drawn by the code in lines 46 through 53. The eighth of these lines has one extra bar-drawing call, because the Code 128 Stop character has an extra terminating bar. These lines of code are (with a few exceptions) the only lines of code that would actually be custom-generated by the encoder depending on data content (line 56, which prints the human-readable data characters under the bar code, would of course also change with different data content).

Figure 2:
FIG. 2 is a printout of a gain adjusted code in different scales.
Figure 2:
Figure 2:
Figure 2:
Figure 2:

FIG. 2 shows the printed output of a Microsoft Word document file "C128test.doc", containing five bar code images that vary from each other in X dimension and/or amount of ink spread compensation. Typically, these five images would be created by an encoder program as five separate image files. However, for demonstration purposes, this Word file contains five inserted copies of a single "C128e.eps" image file. Before each insertion, the .eps file was edited slightly to change either the nominal module width (often called the "X dimension" in bar code literature) or the amount of ink spread compensation. The particular parameters set in the eps file, before each of the five insertions, is shown in the caption above each bar code image. The page shown in FIG. 2 was printed to an HP LaserJet 8000 printer (using its PostScript driver), set to its maximum resolution of 600 dpi.

Figure 3:
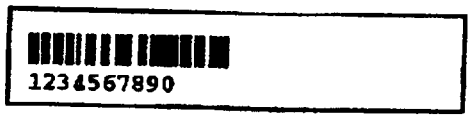
FIG. 3 is a variant of FIG. 2.
Figure 3:
Figure 3:
Figure 3:
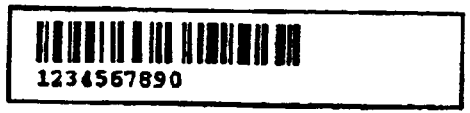
Figure 3:

FIG. 3 shows a second printing of the identical "C128test.doc" file, unmodified from when FIG. 2 was printed. However, before printing this file a second time to create FIG. 3, the print resolution of the HP LJ 8000 printer was set to its alternate resolution of 300 dpi. One can compare FIGS. 2 and 3, noting that the fourth bar code was printed at the nominal 15 mil X dimension when printed to a 600 dpi printer, but that the same image automatically reduced itself to the nearest accurate X dimension (13.33 mils) when sent to a 300 dpi printer. Thus, in FIG. 3, printed at 300 dpi, the 13.33 mil bar code and the supposed 15 mil bar code are identical in length, whereas in FIG. 2, the 15 mil bar code is longer, as expected.

Table 2 shows an alternate method for achieving a "self-adjusting" definition of the X dimension to fit different printers. Table 2 is an image file similar to Table 1, but uses a different programming technique in order to achieve the invention's goal of automatically setting the module width to match the printer resolution.

The PostScript "program" is identical to the one shown in FIG. 1, except that line 19 of Table 1 (which defines the self-adjusting X dimension) has been replaced by an alternate self-adjustment method, shown in Table 2 as lines 20 through 26. Note that the original Table 1 method is still shown in Table 2 for comparison (Table 2, line 19) but has been "commented-out" so that only the alternate method defined by lines 20 through 26 is active.

In the Table 2 embodiment, the X dimension self-adjusts, but not by using the "truncdot" routine. Instead, the EPSF file asks directly for the current printer's current dots per inch capability (along the X axis) on line 23, and assigns the reciprocal of the DPI to a variable called "dotpitch" on line 24. For example, if the current printer resolution is set to 300 DPI, then dotpitch will be set to ⅟300 or 0.003333 inch, which is the physical distance between printer dot centers at this printer resolution. Dividing the requested X dimension by the dot pitch (see line 31 gives the number of dots needed to create a bar of that X dimension. Line 26 truncates that number down to an integer number of dots (if the original X dimension request needed a fractional number of dots), and then recalculates the X dimension, based on the integer number of dots.

The print gain adjustment is then calculated (still using the "truncdot" technique of Table 1, but this could equally well be accomplished by a revised line 27 using this same alternate approach used in lines 20 through 26 (i.e., basing the adjustment on explicit use of the printer's current DPI setting).

Figure 4:
FIG. 4 shows the output of Table 2's image file, embedded in a Word document, printed to a 600 dpi printer, which can print a 15 mil symbol precisely.
Figure 5:
FIG. 5 shows the output of the identical Word document, when the resolution of the same printer has been changed to 300 dpi.

FIG. 4 shows the output from printing this 15 mil image file (embedded in a Word document file) to a 600 dpi printer, and FIG. 5 shows the identical Word file sent to the identical printer, after the printer's DPI had bee changed to 300 DPI. Measurement of the two bar codes will demonstrate that the barcode in FIG. 4 was rendered at 15 mils (the bars and spaces of the bar code comprise a total of 90 module widths, and 90 times 0.015 equals 1.135 inch), whereas the one in FIG. 5 was rendered at 13.33 mils (90 times 0.0133 equals 1.2 inch).

Note that the technique shown in Table 2, unless extended as described in this paragraph, can fail to provide a correctly-adjusted X dimension, if the embedded EPSF image has been rotated (for instance, the user of a desktop publishing program can rotate the embedded bar code image). If rotated by 90 degrees (the only angle, other than zero degrees, in common usage when bar codes are printed), the technique will still succeed, unless the printer has different dot pitches in its X and Y axis. The EPSF program can be modified to allow for this eventuality by invoking a call to the postscript operator "currentmatrix", which returns a 6-number array describing the Current Transformation Matrix (CTM). A reading of section 4.3.3 of the *PostScript Language Reference third edition* shows that the second number in this array will be 0 if no rotation is in effect, and if non zero, then that number represents the sine of the current angle of rotation. The EPSF program of the current invention can therefore easily be enhanced to obtain the current rotation angle, and if non-zero, to apply trigonometric functions in order to obtain a printer-adjusted X dimension that is correct for the current rotation angle. This enhanced version would use both the X-axis and Y-axis entries of the HWResolution array obtained in line 23 of Table 2 (as shown in Table 2, only a "get" of the zeroth entry is shown, which obtains only the resolution in the device's X axis).

One skilled in the art can appreciate that many variations on the above method can be made, without departing from the spirit of the current invention.

Although the PostScript language is used in this disclosure, another vector-graphics language (such as, but not limited to, HP PCL) could be utilized.

Other ways of designing a program to perform the mathematical functions disclosed herein could be devised to achieve the same novel goal (automatic adjustment of X dimension to improve print accuracy regardless of printer resolution).

One skilled in the art could easily utilize the techniques disclosed-herein to draw two-dimensional symbols.

The preferred embodiment shown always reduces the requested nominal module size (if it needs to be changed), rather than enlarging it. This is done so that the modified bar code image will always fit within the space originally allotted for it on the page. However, as an option, the encoder could originally be asked to create a larger EPSF "bounding box" than required (as an example, 10% larger), and could then generate a variant of the EPSF program that will round the nominal modules size upwards, rather than downwards, if the nearest pixel-multiple width is no more than 10% larger than the original requested module width. Similarly, the self-adjusting X dimension could be allowed to round up to the next larger number of dots, rather than down, if the bounding box is calculated accordingly, with sufficient extra space around the bar code to allow for the largest rounding increase that could be anticipated, based on the requested X dimension and the range of printer resolutions expected.

Table 3 shows a third embodiment, in a PostScript bar code image file, that can control (within preset limits) the extent to which the size of the bar code may be changed by the user once it has been embedded in a larger document (such as a word processing or page-layout program). Table 3 is an image file similar to Table 2, but adds programming techniques in order to achieve the invention's goal of automatically controlling (within preset limits) the extent to which the bar code image can be scaled once embedded in a larger document, and setting the module width and other critical parameters to match the printer resolution.

Table 3 shows a complete EPSF file that will generate a Code 128 symbol, and that will automatically adjust its own size when rasterized to a given dot pitch, and exercises control over scaling by the user.

Lines 1 through 12 consist of comments and standard EPSF commands (some required in every EPSF file), which will be readily understood by anyone conversant with PostScript programming. Lines 13 through 18 define procedures that have been described above. Lines 19 through 31 are utility procedures that help accomplish transformations between user space and device space as described above, but using the "dtransform" and "idtransform" operators (which work on "delta's" betweeen between points, rather than absolute coordinates). Note in particular line 30, which translates a requested X dimension into an integer number of printer dots. As was the case in the embodiments described above, this operation provides the ability to draw bars and spaces that are exact multiples of a unit width, for optimum accuracy. However, again like the previous embodiments, the translation can be "scaled" if the user has embedded this image in a larger document and then stretched or shrunken the image. In this case, although an accurate bar code results, the bar code may (because of the user's actions) be rendered at a very different physical size than was specified Oust as any other image can be made much larger by stretching it). This routine, when invoked, will assign this calculated number of dots to a variable called "xdots" (which is susceptible to user's scaling). The additional routines in this embodiment, described below, will calculate a scaling-independent variable called "pdots", and provide logic that can limit or even prohibit user scaling.

Lines 32 through 50 define the requested default values for X dimension, bar height, and other parameters that need to be selected when "encoding" or generating a bar code image file. Note in particular lines 37 and 38, which respectively define how small or large the user will later be allowed to shrink" or "stretch" the bar code image in use. Lines 52 through 66 repeat these variable settings; this "copy" of the settings can be changed (by hand editing, or preferably by a custom editing program), while leaving the default values (on lines 32 through 50) unchanged, so that they can be reinstated if desired.

Lines 69 through 79 define a new routine called "calcDPM", which first calculates pdots (translating the requested X dimension to the equivalent number of printer dots, but based on the hardware resolution of the printer, and thus immune to user scaling). It similarly translates the minimum and maximum allowed sizes to printer dots, and then decides which number to accept. It accepts xdots (allowing a degree of user scaling) if the user has not exceeded the upper and lower size limits, but instead chooses "minpdots" if the user has tried to make the image too small, or "maxPdots" if the user has tried to make the image too large. If the upper and lower limits were both to be set equal to the original requested X dimension, then no user size changes would be allowed.

Lines 80 through 99 define a routine called "calcXYdims", which defines the whole process of determining the x-axis hardware resolution of the printer, calling "calcDPM" to turn that information into a selected dots-per-module, and then sets important drawing variables in user space (such as xdim and ydim) accordingly. Since the printer's dot pitch in the X and Y axes may be different, and since on some printers, the X axis and Y axis appear reversed to the printing software, the first lines of this routine establish which of the the x and y hardware variables (discussed below) should be used to set the "dotpitch" in the x direction. Once that is established, the "dpm" can be established as described above. Line 89 sets the dpm in the y axis, based on the ratio between the printer's x and y resolutions. Line 91 then sets the main drawing variables xdim and ydim by translating dots back into user-space dimensions. Line 93 sets another drawing variable that implements the requested bar width reduction (to compensate for expected ink spread). Since the amount of ink spread is the same, regardless of the scale of the bar code, this is specified by the user in absolute dimensions (mils), and this variable is calculated in a way that is immune to scaling of the image. But, lines 94 through 98 ensure that the requested bar reduction is not too much compared to the nominal width of the bar, and limits the reduction to a predefined percentage.

Line 101 begins the "script" portion of the file, which is the preparation and execution of the drawing process. Line 104 allows the dots-per-module calculation to be rounded up somewhat, instead of down, if the encoder had been configured to leave some "room for growth" in the bar code image. Line 106 calculates "xdots", the version of the dots-per-module figure that is user-scalable. In order to invoke the alternate calculations based on printer-resolution information, some extra logic is required (lines 107 through 133), because the preferred method for obtaining that information was not available in the first release of the PostScript language. The second release of the PostScript language was announced in 1990, but it is still the practice to provide backward compatibility when possible, which this section of code accomplishes.

Lines 134 through 158 define the logic needed to draw a bar code of the Code 128 symbology. Most, but not all, of this logic would be used for most other bar code symbologies as well. The logic in this section has already been described in reference to the earlier embodiments discussed above, except for the logic on line 144. This line calculates the height of the bars, as a function of (a) the number of visible modules in the bar code and (b) "ydim" which was earlier calculated to be physically equal to "xdim", but not subject to any independent user scaling in the Y axis. For example, if the user leaves the width of the image alone, but stretches its height, this distortion will be ignored when the bar code is printed.

Lines 159 through 176 actually draw the bar code (and its associated human-readable text, if that has been enabled); apart from the parameter definitions early in the file, this is the only section of the file that would vary from one Code 128 image to another. This logic has also been described earlier in this discussion.

Figure 6:
FIG. 6 demonstrates the capabilities of the bar code image file shown in Table 3 including six identical copies of the image file, but after inserting these images into a Microsoft Word document file, different amounts of scaling (size changes) were applied, as described within the Figure.
Figure 6:
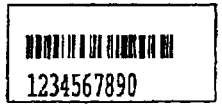
Figure 6:
Figure 6:
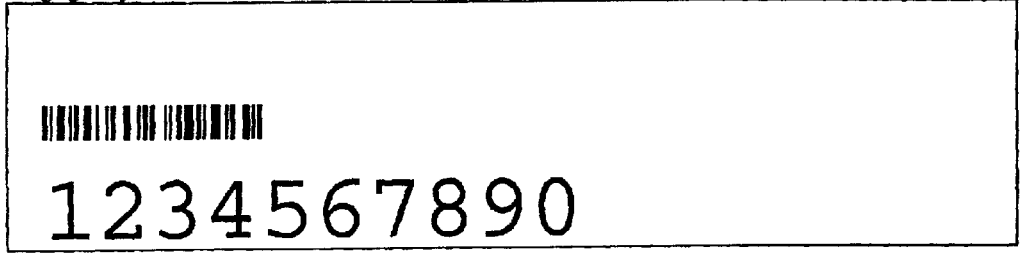
Figure 6:
Figure 6:

FIG. 6 demonstrates the capabilities of the bar code image file shown in Table 3. FIG. 6 contains six identical copies of the image file, but after inserting these images into a is Microsoft Word document file, different amounts of scaling (size changes) were applied, as described within the Figure. In the Word document, black rectangle borders were first added around each of the embedded images, so that the various size changes can be easily seen onscreen and in the printed output. These images show that the image file can control the degree to which the user can change the size of the printed image.

Note in particular that the human-readable text beneath the bar code, which is also generated by the bar code image file of the present invention, has not been protected against user scaling. It is quite possible to add that facility, so that the text could maintain its proportions relative to the bar code above. This would be accomplished by defining the font size of the printed characters in terms of the X dimension calculated according to the current invention, rather than defining the font size in user-scalable units (called "points"). Protecting the text against scaling was deliberately not done in these sample image files, in order to make the beneficial effects of the present invention more discernable. From the pronounced degree of scaling of the text, the readers of this disclosure can more readily observe that in some cases (the fourth and sixth images) the user attempted to scale the image far beyond the preset limits in the image file.

Table 4 is an image file similar to Table 3, but uses alternate programming techniques in order to achieve the invention's goal of automatically controlling (within present limits) the extent to which the bar code image can be scaled once embedded in a larger document, and setting the module width and other critical parameters to match the printer resolution. These techniques have the advantage of allowing precise control over the printed bar code's physical dimensions, even if the PostScript interpreter does not supply any explicit hardware resolution information.

Figure 7:
FIG. 7 demonstrates the capabilities of the bar code image file shown in Table 4 including six identical copies of the image file, but after inserting these images into a Microsoft Word document file, different amounts of scaling (size changes) were applied, as described within the Figure.
Figure 7:
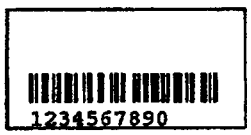
Figure 7:
Figure 7:
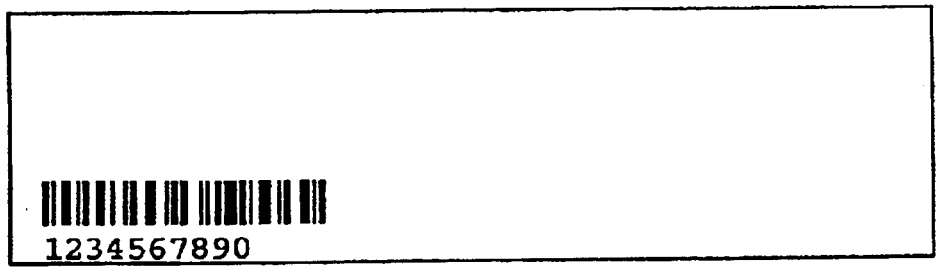
Figure 7:
Figure 8:
FIG. 8 shows the printed page of a QuarkXPress document demonstrating that proper scaling of a bar code produced from the image file of Table 4 can be maintained even when rotated.
Figure 8:
Figure 8:
Figure 8:

FIGS. 7 and 8 are printed document pages that demonstrate the capabilities of the bar code image file shown in Table 4. Unlike the previous examples, these show that the relative size of the human-readable text, compared to the size of the bar code, can be maintained despite scaling of the image. FIG. 7 contains five identical copies of the image file, but after inserting these images into a Microsoft Word document file, different amounts of scaling (size changes) were applied, as described within the Figure. FIG. 8 shows a printed page of a QuarkXPress document, which demonstrates that proper scaling of the bar code can be maintained even when the embedded image is rotated ninety degrees.

Specifically, Table 4 shows another embodiment, in a PostScript bar code image file, that can control (within preset limits) the extent to which the size of the bar code may be changed by the user once it has been embedded in a larger document (such as word processing or page-layout program). Table 4 is a complete EPSF file that will generate a Code 128 symbol and that will automatically adjust its own size when rasterized to a given dot pitch and exercises control over scaling the user. This embodiment differs from that shown in Table 3, in that the technique shown in Table 4 has the advantage of working in all respects even if the PostScript interpreter system does not supply HVResolution information. In addition, the techniques of Table 4 demonstrate how the human-readable text beneath the bar code can be made to maintain the same relative size compared to the bar code, even after the image has been inserted into a document and then scaled.

Lines 1 through 38 of Table 4 are almost identical to the corresponding portions of Table 3 with three minor additions. Line 19 defines an abbreviation for an often-used sequence of PostScript commands. Lines 46 and 69 define a new user-selectable feature called "STBarLocked". True by default, this setting prevents scaling once the image is embedded in a larger document (that is, if the image is stretched or shrunk, the bar code nonetheless still prints at the original size). This setting can be changed to false to "unlock" the image file, in which case the size of the bar code can be scaled after it is embedded (but only between the size limits set on Lines 47 and 48). Line 37 defines a procedure "calcYdots", which is identical to the previously-described "calcXdots," except that it works in the Y axis, rather than in the X axis.

Lines 90 through 139 define a new routine called "remx", which detects whether or not the scale of the image has been changed from the default PostScript scale (where one unit equals 1/72 inch). This is accomplished by working directly with the PostScript CTM (Current Transformation Matrix). The CTM defines the relationship between the virtual image coordinate system of the electronic page, and the physical coordinate system of the printer. The first four numbers of this six-element array (called 'a', 'b', 'c', and 'd') control rotation and scaling (the last two numbers control translation, and can be ignored). Line 97 gets the four important matrix elements for the "default" matrix (which uses the default scale of 1/72 inch), and Line 98 gets the same elements for the "current" matrix (whose scale may no longer by 1/72 inch, if the user has "stretched" or "shrunk" the embedded image). Lines 99 through 102 calculate 'xrat' and 'yrat', indicating how much the image has been scaled in the X and Y axes. This code takes into account the fact that (depending on whether the image has been rotated 0 or 90 degrees) either 'a' and 'd', or 'b' and 'c' will be the correct X and Y scaling numbers (and the other two numbers will be zero).

IF "STBarLocked" is "true", then the user's scaling is "undone" by Line 104, re-establishing the default 1/72 scale, and then Lines 105 through 111 can easily transform critical dimensions into printer dots, using techniques previously described.

IF "STBarLocked" is "false", then the user's scaling will change the critical dimensions, but only within the limits set by Lines 47 and 48. Line 96 calculates the minimum and maximum degree of scaling, compared to the requested X dimension, that would still stay within those limits. However, the physical size of the requested X dimension when printed is not itself yet known, because the user may have scaled the image. To establish this physical correlation, without checking the system's hardware resolution (which is not available in all PostScript implementations), Lines 113 thorough 116 temporarily rescale the matrix to default units, so that the number of dots corresponding to a 10 mil symbol can be calculated. Note that this code first calculates the number of dots per inch, and then divides-down to 10 mils (keeping the fractional dot if any), to avoid roundoff error, if the current printer has a DPI such as 1017, which cannot represent 10 mils in an integer number of dots. It uses 1000.01, rather than precisely 1000, to avoid possible round-off error by the PostScript interpreter.

Lines 118 through 121 calculate a scale factor "sf" (normally equal to the degree the user has scaled the image horizontally, but "capped" by the limits calculated above). Line 122 rescales the image to the "capped" amount if necessary, but has no effect if the user has not exceeded the scaling limits. Lines 127 and 128 calculate the resulting dots per module in both axes.

Under most circumstances, this would complete the dpm and dpm Y calculations, but it is possible (if the user has sufficiently reduced the image size) that the resulting X dimension, after being truncated down to an integer number of dots, may now fall (by a fraction of a dot) below the lower mil size limit set by Line 47. Line 129 checks for this possibility, and Lines 130 and 131 increase the DPM (proportionately in both axes) accordingly. Line 132 calculates a number of dots for print gain adjustment. Finally, now that the numbers of dots for all critical parameters have been set, the image scale is again adjusted (by lines 133 through 135) so that the scale of human readable text will match the scale of the bar code.

Line 144 begins the "script" portion of the file, which is the preparation and execution of the drawing process. Line 149 invokes the "remx" procedure just described; as a result, dots-per-module in both axes, and the number of dots of bar width reduction, are set. Lines 151 through 156 convert these dot-based numbers back to user-space dimensions, as described previously. The remainder of this image file draws the Code 128 symbol and its human readable text, using the same techniques described earlier.

FIGS. 7 and 8 demonstrate the capabilities of the bar code image file shown in Table 4. FIG. 7 contains five identical copies of the image file, but after inserting these images into a Microsoft Word document file, different amounts of scaling (size changes) were applied, as described within the Figure. In the Word document, black rectangle borders were first added around each of the embedded images, so that the various size changes can be easily seen onscreen and in the printed output. These images show that the image file can control the degree to which the user can change the size of the printed image. Note in particular that the human-readable text beneath the bar code, which is also generated by the bar code image file of the present invention, has been scaled to match the user's scaling, so that the text maintains its proportions relative to the bar code above. FIG. 8 shows four copies of the same image file inserted into a QuarkXPress document; the second image was rotated by 90 degrees after insertion; the third image was scaled by 60% (therefore slightly exceeding the 15-mil limit), and the fourth image was both scaled by 60% and rotated by 90 degress after insertion. It can be seen from this figure that the controlled-rescaling properties of the image file are maintained, even if the image is rotated after insertion.

Notice that, because the coordinate system of the image file was rescaled to match the scaled X dimension (and scaled DPM), any other text or graphic elements drawn along with the bar code will be properly scaled to match its proportions. However, it should be apparent that the technique shown in Table 4 could be simplified somewhat, if only a bar code (plus optional text of a given font size) is to be drawn. In this case, one can simply calculate the xrat and yrat as shown, set the matrix back to the default scale (as shown in Line 114 of Table 4), but leave the image at the default scale of 1/72 inch. If arbitrary additional graphics will not be drawn, then no further resealing is necessary, and so Lines 116 and 122 and 135 could be commented-out or deleted. Instead, to achieve the effect of the rescaling, it would be sufficient for Lines 127 and 128 to be modified to multiply the requested STBarXdim by the scale factor just determined. Similarly, one would multiply the requested font size by the scale factor, to keep the human readable in proportion to the bar code.

Table 5 is an image file similar to those previously shown, but with some changes in its organizational structure that facilitate editing using a touch-up tool that might have no specific knowledge of the characteristics of the symbology that was encoded.

Table 5 shows another embodiment, in a PostScript bar code image file, that draws the same Code 128 barcode as did the previous figures, using the same techniques. Table 5 differs from the previous embodiments in two ways. First, many variable and function names have been abbreviated (this was done to save disk space and transmission time, when documents incorporating many image files are stored or sent to a printer). Second, the file structure has been reorganized somewhat. The reorganization facilitates the design of a simple Touch Up Tool (TUT) that contains no encoding logic, but that can change most of the graphical parameters of a bar code image file.

In practice, the present invention would allow third parties to modify an image file safely, to improve its printed quality or for other aesthetic reasons. For example, the owner of an encoding program could encode a bar code image file of a given symbology and data content, then send the image file to a second party (such as an advertising agency or packaging designer) who would embed the image in a larger document (for example, an advertisement for a newspaper, or the file representing the text and images to be printed on a product's outer packaging). At a later date, that second party (or a third party, such as a worker at a print shop) would have the ability to adjust the parameters of the bar code image in order to improve its print quality, even if the second or third party is not in possession of an encoding program. For example, it may be the image will be printed on very rough paper, and a larger X dimension is needed, or it may be that the printing press is laying on more ink than expected, and the widths of the bars of the symbol should be made narrower to pre-compensate for the ink spread.

The image file shown in Table 5 will be described in detail below, after a brief description of the tool's operation. In general, the file's format has been carefully designed to make all the desired graphical parameters readily available to the touch-up tool for modification. As the TUT reads in the original file, it can easily parse the file for the parameters that the TUT will be allowed to change. In addition, the file contains information that indicates to the TUT what the allowed ranges are for these parameters, and how to present this information to the user of the TUT. The TUT does not need to actually "understand" the changes that it is requested to make. Instead, it is the program code portions of the image file that, at time of printing, will draw the symbol using the revised values of the graphical parameters. The TUT does not need to modify the program code portions of the file, and therefore the TUT does not need to incorporate any encoding abilities. The file also contains checksums on the variables and program code of the file, so that the TUT can detect if the file has been corrupted at any time since it was originally encoded.

In general terms, the tool operates as follows. The user starts up the TUT program, which allows the user to select an EPS image for modification (wildcard specifications could be permitted). The tool will read in the first image file meeting the user's criteria, and display on the screen all of the pertinent information about the image file. This would include both information that cannot be changed (such as the symbology type and data content) and parameters that can be changed (such as the X dimension and the presence or absence of human readable text). The format of the variable declarations in the file, plus associated comment strings, allows the TUT to display the current values of the changeable parameters, and their limits, in a user-friendly screen format. The user would then enter new values for any parameters he or she wishes to alter, and would then instruct the program to make these changes in the requested image or images (the user may request to modify a single eps file, or may be allowed to specify all of the eps files in a specified directory, or all of the eps files embedded in a larger PostScript document). The tool would make the changes (or report errors if encountered). A detailed description of a sample image file supporting this facility is provided immediately below.

Line 24 of Table 5 begins a "resource", which is a portion of the file that can be treated as a common library. This particular "resource" declares variables that are typically used by all symbologies. Lines 26 through 44 constitute a section of this resource that declares the default values (set by the encoder when it created this file) for public variables that are not symbology specific. Immediately after the end of this section (recognizable by the comment line "STBarEndDefaultGeneralVars", Line 45 creates a check sum variable for the preceding section. This checksum is calculated over both the variable names and their values, so that a change in either can be detected. The procedures on lines 105, 149, and 152 are the utility routines that calculate the expected checksum value. When this image file is sent to the printer, the code on lines 160 and 161 run the checksum calculation, and set a variable "fbr" to true if the calculation does not match the value declared on line 45. If any of the variables-declarations sections of the file have been corrupted, then the variable 'fbr' will be set true, and the user can be warned that the file is corrupted (in this embodiment, an 'X' is drawn through the image by the routine on lines 186 and 187, if 'fbr' is true after all the checksums have been checked).

The algorithm for the checksum on a variables section is as follows:

```
Init the checksum chk to 0
Init the position counter weight to 2 (so first weight will be 3)
DO FOR each STBar variable declared in the subsection
   BEGIN
   Increment weight by 1
   Sum the ASCII byte values of the var's name, and add to chk
   SWITCH on the type of the associated value:
       BOOLEAN: if "true" val = 7, otherwise val = 3
       INTEGER: val = value
       REAL: val = round (value * 10)
       STRING: val = Sum of the ASCII values of the chars
          within the string
       DEFAULT: An ERROR: an unsupported variable type.
   END SWITCH
   chk = chk + (val * weight)
   chk = chk mod 9973
END
```

Note that all the variables declared in this section begin with "STBar", and that the next prefix letter is either 'T' or 'E'. A 'T' indicates a variable that can safely be changed by a TUT at a later date; an 'E' indicates that only an Encoder may assign values to the variable. The encoder creates a copy of the variables declarations (see lines 47 through 56), but copies only those variables that had a 'T' prefix, and it deletes the 'T' as it makes the copy. This is done so that a second checksum can be calculated on this second section, and if a TUT changes some values (and properly updates the checksum variable on line 57), the original checksum variable on line 45 is still correct. If a TUT detects that this second section has been corrupted, but verifies that the first (defaults) section is intact, the TUT can mechanically re-create a second section, using the validated values from the first section.

Note also that those variables in the first variables section with a 'T' prefix also have a descriptive comment next to them. The format of these descriptive comments is unimportant to the PostScript interpreter within the printer, but the format needs to be an established convention between the Encoder and the TUT. This is so that a TUT can display the name of the variable (and provide help for the user of the TUT) after reading in a file. In this example, the text immediately after the '%' is the name to be displayed, and the text in parentheses is a helpful hint for the user. By using a convention such as this, new variables can be added to the system, without obsoleting the human interface of existing TUTs in the field. For this to work safely, however, the TUT also needs to know the allowed ranges of the variables that it is allowed to change. Many variables are Boolean (obviously, only "true" and "false" are allowed), but others need to have ranges declared within this section. For example, if the TUT reads in the variable STBarTX, it knows that it can alter the corresponding variable STBarX (no 'T'), and can tell the allowed minimum and maximum values from the associated variables STBarEMnX and STBarEMxX, respectively. Note finally that some of these comments do not begin immediately after the '%' (such as the first one, for STBarBBX). This is true, in the convention used in this example, for those variables that will not be displayed in the user interface of the TUT. STBarTBBX and STBarTBBY will not be displayed to the user, even though they have 'T' prefixes, because while a TUT can change these variables, the change is not directly under the user's control.

The third and final subsection of this resource (lines 59 to 71) declares "local" variables that are used by the utility routines of the file, but that are never accessed by the user (neither in the Encoder nor in the TUT).

Lines 76 through 192 constitute a second "resource" section, where the common utility routines (typically used by all symbologies) are defined. Other than the routines that calculate the variable checksums, the logic in these routines has for the most part been described in previous embodiments. Note that line 190 declares a checksum variable that would be calculated by the encoder, over the text of the program code in this section (this checksum was not implemented at the time of this disclosure). Nothing in this section would ever be modified by a TUT, but the TUT would calculate a checksum over these lines of code and validate the stored checksum on line 190. The checksum algoritim used in this example is:

```
Initialize the calculated checksum chk to 0
For each line of code in this section (including '%%' comments but
  excluding all other comments),
DO:
    IF the line starts with /PC, set pgmchk to the value on this line,
    and break out of this loop
    ELSE
        Sum the byte values of each ASCII character on the line
        (excluding any bytes less than 32), and add this sum to chk
        chk = chk mod 31991
END
```

If chk equals the stored pgmchk value, the program code has not been corrupted

Lines 195 through 216 define a third resource in this file: variables that are specific to the symbology represented in this file (in this case, Code 128). It has a three-part structure, similar in format to the variable resource described earlier. If an image file should contain more than one symbology (for example, for a Composite code or a shipping label), then additional symbology-specific sections would be added as needed. Note that the start of this section (line 195) is formatted such that the TUT can easily find the name of the Symbology and present that name in the user interface, along with whatever user-accessible variables are declared in this section.

Similarly, lines 219 through 242 define a fourth resource, this time containing symbology-specific procedure definitions. This is followed by the "script" portion of the eps file, where the actual drawing of the bar code and human readable text is accomplished, by the means described under previous embodiments.

It is important to note that a Touch-Up Tool can read in this file, and provide the user with the ability to change many graphical parameters, even though the TUT may well have no ability to actually encode a symbol of this symbology. The TUT need only check that the various resource sections have correct checksums, and then present the graphical parameters (represented by those variables flagged with a 'T') to the user to make desired changes (within the limits specified in the Defaults variables sections). The parameters that a TUT can change in the example program of Table 5 are those declared on lines 51 through 55, and the variable declared on line 206:

1. STBarX: The nominal module size (X dimension),
2. STBarR: The amount of extra white border within the bar code image, to support the file's ability to pick a slightly larger X dimension than specified, to match the dot pitch of a given printer;
3. STBarLk: Whether the image file will allow itself to be stretched or compressed once embedded in a document;
4. STBarPgaX: how much Print Gain Adjustment should be applied, to compensate for ink spread;
5. STBarHRV: whether or not to print the human readable text corresponding to the encoded data
6. STBarHightRatio: how tall the bars will be printed The TUT may also need to change the size of the image (for example, if the X dimension is made larger). This changed size can be calculated by the TUT in any of several different ways. One way would be by examining the default values of STBarBBX and STBarBBY (which give the upper right corner of the image's Bounding Box) as were set for the default X dimension, and scaling those numbers by the ratio of the default X to the new X dimensions. Another way would be by parsing the "drawing instructions" on lines 255 through 264, in order to calculate the total width of the symbol in modules (then multiplying that sum by the new X dimension). Alternatively, the encoder could add a variable to the Defaults section, indicating the total width of the symbol in modules.

Other graphical parameters could be made available to the TUT as well. For example, the TUT could be allowed to change the size of the human readable text (in points), its placement (above or below the bar code), the colors to use for the bars and spaces, and the orientation of the bar code (horizontal or vertical). All of these can be changed, without implying an ability to encode a symbol, so long as the image file adheres to the format specified in this embodiment. Also, at the cost of a small degree of additional complexity, the TUT could incorporate the ability to convert the vector image file into one or more raster image formats (such as Tiff or bitmap). To do this, the TUT would not need encoding abilities per se, but it would need the ability to "understand" the drawing commands that were encoded into the file. In Table 5, lines 174 through 182 define the standard commands we have defined for drawing bars and spaces of various widths, and lines 255 through 264 utilize these commands to draw a Code 128 symbol. One skilled in the art could easily create a program that would read these lines of code, and create a rasterized image corresponding to those commands. Since the TUT only needs to parse the widths and heights of rectangles in order to draw the image, and since this information is readily available in this image file format, this function in a TUT is far simpler than that of a general-purpose PostScript Raster Image Processor.

In the embodiment shown in Table 5, the values of variables declared in the resource sections are always fixed numbers (not calculations). A further enhancement to the TUT could be made, allowing calculations to be used as well. For example, line 37 indicates that 2 mils of Print Gain Adjustment (bar width reduction) will be applied by default; the 'T' prefix indicates that this value can be changed by the TUT. Unlike other variables, however, the min and max values for this variable are not easily specified by fixed numbers, because the bar width reduction obviously cannot exceed the width of the bar, as set by the X dimension. In fact, line 38 indicates to the TUT that it should not allow PGA to exceed 60% of the nominal bar width. However, as implemented in Table 5, a TUT would need to have "built-in knowledge" that it should multiply the value of STBarEMPgaX by the current X dimension, in order to determine the maximum allowed value of PgaX. An enhancement to the file format would eliminate the need for this "built-in knowledge", at the expense of some additional complexity in the TUT. The enhancement would be for the TUT to incorporate a "calculator" function, and to expand the definition of the image file format to allow calculations to be used as variable values. A "postfix" calculator (where operators follow their operands) is especially easy to implement. In this example, the declarations could then be redefined using postfix calculations (represented as text strings starting with "!!:") as:

/STBarTPgaX 2.000 def
/STBarEMxPgaX (!!: 0.6 STBarX *)−
/STBarEMnPgaX (!!:STBarEMxPgaX−1*)

The software design of a calculator function (postfix or otherwise) is well known in the art, but its application to an image format to facilitate editing of an encoded image, by a tool that does not itself have encoding abilities, is believed to be novel.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

TABLE 1

1. %!PS-Adobe-3.0 EPSF-3.0
2. %%Creator: A Program V1.0
3. %%Title: C128e.EPS
4. %%CreationDate:
5. %%BoundingBox: 0 0 150 30
6. %%LanguageLevel: 2
7. %%DocumentFonts: Courier
8. %%EndComments
10. gsave
11. /bardict 100 dict defbardict begin
12. /bdef {bind def} bind def
13. /snap {transform .25 sub round .255 add exch .25 sub round .25 add exch itransform} bdef
14. /truncdot {transform truncate exch itransform } bdef
15. /smoveto {snap moveto} bdef
16. /slineto {snap linetop56 bdef
17. /fontsize 8.000000 def    %n-point font
18. /fontY 5 def       %height, from bottom of box, where h.r. is drawn
19. /xdim 13.33 0.072100 mul 0 truncdot pop def
20. /printgainadj xdim 2 div 0 truncdot pop def
21. %%%/printgainadj 0 def
22. /hightratio 0.15 def
23. /leftQZ 10 xdim mul def
24. /currXpos left QZ 0 snap pop def%will draw first bar to right of left quiet zone
25. /currY pos 0 fonY fontsize add snap exch pop def
26. /fontX currXpos def %left-align HR with first bar of bar code
27. /nxymchars 8 def
28. /nmodules 11 nsymchars mul 2 add def
29. /h nmodules hightratio mul xdim mul currYpos add def
30. /startBar {newpath currXpos currYpos smoveto} bdef
31. /move'X {currentpoint pop xdim add currYpos slineto} bdef
32. /moveXadj p55 currentpoint pop dup /leftpoint exch def
   a. x dim add printgainadj sub currYpos slineto} bdef

TABLE 1-continued

33. /finishBar {currentpoint pop h slineto currXpos h slineto closepath fill
    a. leftpoint xdim add currYpos smoveto /currXpos currentpoint pop } bdef
34. /B1 {startBar move1Xadj finishBar} bdef
35. /B2 {startBar move1X move1Xadj finishBar } bdef
36. /B3 {startBar move1X move1X move1Xadj finishBar } bdef
37. /B4 {startBar move1X move1X mov31X mov31Xadj finishBar} bdef
38. /S1 {/currXpos currXpos xdim add 0 snap pop def currXpos CurrYpos smoveto} bdef
39. /S2 {S1 S1} bdef
40. /S3 {S1 S1 S1} bdef
41. /S4 {S1 S1 S1 S1} bdef
42. %%BeginSetup
43. false setoverprint %note: this is a language level 2 feature
44. %%EndSetup
45. setgray
46. B2 S1 B1 S2 B3 S2
47. B1 S1 B2 S2 B3 S2
48. B1 S3 B1 S1 B2 S3
49. B3 S3 B1 S1 B2 S1
50. B2 S4 B1 S1 B1 S2
51. B2 S1 B4 S1 B2 S1
52. B1 S2 B4 S2 B1 S1
53. B2 S3 B3 S1 B1 S1 B2
54. %%IncludeFont: Courier
55. /Courier findfont fontsize scalefont setfon fontX fontY smoveto
56. (1234567890) show
57. end
58. grestore
59. showpage

TABLE 2

1. %!PS-Adobe-3.0 EPSF-3.0
2. %%Creator: A Program V1.0
3. %%Title: DOTTEST.EPS
4. %%CreationDate:
5. %%BoundingBox: 0 0 150 30
6. %%LanguageLevel: 2
7. %%DocumentFonts: Courier
8. %%DocumentNeededFonts: Courier
9. %%EndComments
10. gsave
11. /bardict 100 dict def bardict begin
12. /bdef {bind def} bind def
13. /snap {transform .25 sub round .25 add exch .25 sub round .25 add exch itransform} bdef
14. /truncdot {transform truncate exch truncate exch itransform} bdef
15. /smoveto {snap moveto} bdef
16. /slineto {snap lineto} bdef
17. /fontsize 8.000000 def    %n-point font
18. /fontY 5def    %height, from bottom of box, where h.r. is drawn
19. %%%/xdim 13.33 0.072100 mul 0 truncdot pop def
20. /xdim 15.0 1000 div
21. /dotpitch % will def this below
22. 1
23. currentpagedevice/HWResolution get 0 get %get dpi in X direction
24. div def % sets dotpitch
25. dotpitch div   % calc (f.p.) number of dots for requested X dimension
26. truncate dotpitch mul 72.1 mul def % set xdim to integer number of dots
27. /printgainadj xdim 2 div 9 truncdot pop def
28. %%%/printgainadj 0 def
29. /highratio 0.15 def
30. /leftQZ 10 xdim mul def
31. /currXpos leftQZ 0 snap pop def %will draw first bar to right of left quiet zone
32. /currYpos 0 fontY fontsize add snap exch pop def
33. /fontX currXpol def %left-align HR with first bar of bar code
34. /nsymchars 8 def
35. /nmodules 11 nsymchars mul 2 add def
36. /h nmodules hightratio mul xdim mul currYpos add def
37. /startBar {newpath currXpos currYpos smoveto} bdef
38. /move1X {currentpoint pop xdim add currYpos slineto} bdef

TABLE 2-continued

39. /move1Xadj {currentpoint pop dup /leftpoint exch def
    a. xdim add printgainadj sub currYpos slineto} bdef
40. /finishBar {currentpoint pop h slineto currXpos h slineto closepath fill
    a. leftpoint xdim add currYpos smoveto /currXpos currentpoint pop def} bdef
41. /B1 {startBar move1Xadj finishBar} bdef
42. /B2 {startBar move1Xmove1Xadj finishBar} bdef
43. /B3 {startBar move1X move1X move1Xadj finishBar} bdef
44. /B4 {startBar move1X move1X move1X move1Xadj finishBar} bdef
45. /S1 {/currXpos currXpos xdim add 0 snap pop def currXpos currYpos smoveto} bdef
46. /S2 {S1 S1} bdef
47. /S3 {S1 S1 S1} bdef
48. /S4 {S1 S1 S1 S1} bdef
49. %%BeginSetup
50. false setoverprint %note: this is a language level 2 feature
51. %%EndSetup
52. setgray
53. B2 S1 B1 S2 B3 S2
54. B1 S1 B2 S2 B3 S2
55. B1 S3 B1 S1 B2 S3
56. B3 S3 B1 S1 B2 S1
57. B2 S4 B1 S1 B1 S2
58. B2 S1 B4 S1 B2 S1
59. B1 S2 B4 S2 B1 S1
60. B2 S3 B3 S1 B1 S1 B2
61. %%IncludeFont: Courier
62. /Courier findfont fontsize scalefont setfon fontX fontY smoveto
63. (1234567890) show
64. end
65. grestore
66. showpage

TABLE 3

1. %!PS-Adobe-3.0 EPSF-3.0
2. %%Title: c128__1234567890a.eps
3. %%Creator: STBar V1.0
4. %%CreationDate:
5. %%BoundingBox: 0 0 90 20
6. %DocumentFonts: Courier
7. %DocumentNeededFonts: Courier
8. %%EndComments
9. %STBarBeginProlog
10. %the following section is always present and unchanged in an STBar image:
11. gsave
12. /STBarDict 100 dict def STBarDict begin
13. %STBarBeginProcSet
14. %This section consists entirely of abbreviations and procs using no variables:
15. /bdef {bind def} bind def
16. /snap {transform .25 sub round .25 add exch .25 sub round .25 add exch itransform} bdef
17. /smoveto {snap moveto} bdef
18. /slineto {snap lineto} bdef
19. % PROC pop1 - of top 2 inputs on stack, takes abs, pops the lesser of the two
20. /pop1 {abs exch abs exch 2 copt it {exch pop} {pop} ifelse} bdef
21. % PROC converts requested print gain adjustment, rounds to fit dot pitch
22. %input: requested pgn in mils; output: BWR, in dots
23. /convPGAdots {.0720 mul 0 dtransform abs round exch abs round exch pop1} bdef
24. % PROC convDDots - input: 1D delta coords (eg, [X,0]), output: X of delta in user space
25. /convDDots {idtransform pop1} pdef
26. % PROC dots - input: dim, dotpitch; output: corresponding num of dots (trunc'd)
27. /dots {1000 mul div truncate} bdef
28. % PROC calcXdots - input: Xdim in mils; output: corresponding # of dots,
29. % (truncated, not rounded); note: can be scaled by stretching bounding box

TABLE 3-continued

30. /calcXdots {0.0720 mul 0 dtransform pop1 truncate} bdef
31. %STBarEndProcSet
32. %STBarBeginDefaulGeneralVars
33. %This section initially defines the symbology-Independent vars;
34. %this section can only be changed by an Encoder:
35. /STBarXdim 10.0 def       % Requested X dimension, in mils
36. /STBarXdimRoundup         % percent of Xdim increase
    1.05 def                  allowed, to match...
                              i. %... printer dot pitch rounding upwards
37. /STBarMinX 6 def
38. /STBarMaxX 15 def/
39. %Requested bar width reduction for ink spread compensation:
40. /STBarPrintgainadjX 5 def  % (in mils)
41. /STBarMaxPGAX 0.7 def      % (max percent of X dimension we'll shave)
42. /STBarHightRatio 0.15 def  % as a percentage of symbol's length
43. /STBarXOrigin 1 def        % distance from left edge of bb, in points
44. /STBarYOrigin 1 def        % distance from bottom of bb, if no H.R.
45. %Human-Readable vars (definded regardless of whether HR is currently enabled):
46. /STBarFontSize 8 def       % n-point front
47. /STBarFontY 1 def          % height, above bottom of box, to draw H.R.
48. /STBarHRstr (1234567890) 55 string cvs def %this CANNOT be changed by touch-up
49. /STBarHR Visible false def
50. %STBarEndDefaultGeneralVars
51. %STBarEndProlog
52. %STBarBeginGeneralVars
53. %the following are the symbology-independent variables that can be touched up:
54. /STBarXdim 10.00           % Requested X dimension, in mils
55. /STBarXdimRoundup 1.05     % percent of Xdim increase def allowed, to match...
                               i. %...printer dot pitch rounding upwards
56. %Requested bar width reduction for ink spread compensation
57. /STBarPrintgainadjX 5 def  % (in mils)
58. /STBarMaxPGAX 0.50000      % (max percent of
    def                       X dimension we'll shave)
59. /STBarHightRation 0.15 def % as a percentage of symbol's length
60. /STBarXOrigin 1 def        % distance from left edge of bb, in points
61. /STBarYOrigin 1 def        % distance from bottom of bb, if no H.R.
62. %Human-Readable vars (defined regardless of whether HR is curently enabled):
63. /STBarFontSize 8 def       % n-point font
64. /STBarFontY 1 def          % height, above STBarYOrigin, where h.r. is drawn
65. /STBarHRVisible true def   % if false, no room needed for human readable
66. %STBarEndGeneralVars
67. %STBarBeginLocalProcs
68. %procedures that are only invoked if hw resolution is available:
69. % PROC calcDPM - no input; outputs dpm, allowing scaling within limits:
70. /dotpitch 1 def/xdots 6 def/pdots xdots def/minPdots xdots def/maxPdots xdots def
71. /calcDPM{
72. %calc dots/module, and allowed min/max, based strictly on printer's dotpitch:
73. /pdots STBarXdim dotpitch dots def
74. /minPdots STBarMinX dotpitch 1000 mul div 0.5 add truncate def %round UP min
75. /maxPdots STBarMaxX dotpitch dots def
76. %final dpm can be scaled, between min and max limits):
77. xdots minPdots 1t {minPdots} {xdots} ifelse
78. dup max Pdots gt {pop maxPdots} if
79. }bdef
80. % PROC calcXYdims - sets xdim, ydim, BWR, based on hwrx and hwry (no stack I/O)
81. /dotpitch 0 def/dpm 0 def/xdim 0 def/ydim 0 def/BWR 0 def
82. /calcXYdims {
83. % since array order is suspect, find out which res is really X res:
84. 72 0 dtransform abs exch abs exch 1t
85. {/dotpitch 1 hwry div def hwrx hwry /hwrx exch def/ hwry exch def}
86. {/dotpitch 1 hwrx div def}
87. ifelse
88. /dpm calcDPM def
89. /dpm Y dpm hwry hwrx div mul def
90. %finally, set xdim and ydim, by converting back from dots per module:
91. dpm dpmY idtransform/ydim exch abs def/xdim exch abs def
92. %init BWR to number of dots nearest to an absolute mil size (never scaled):
93. /BWR STBarPrintgainadjX dotpitch 1000 mul div round def
94. %now make sure that requested BWR is no more than max pcnt BWR:
95. /BWR dpm STBarMaxPGAX mul BWR 1t
96. {dpm STBarMaxPGAX mul truncate}
97. {BWR}
98. ifelse 0 convDDots def
99. } bdef
100. %STBarEndLocalProcs
101. %STBarBeginScript
102. setgray
103. % allow some roundup of Requested Xdim to match printer dot pitch:
104. STBarXdimRoundup 1 gt {/STBarXdim STBarXdim STBarXdimRoundup mul def} if
105. %translate xdimension to dots/module, based on current external scaling if any:
106. /xdots STBarXdim calcXdots def
107. %if hw res if available, calc pdots (immune to scaling by enclosing app):
108. /languagelevel where {pop languagelevel} {1} ifelse 2 1t
109. %if languagelevel is 1, give up absolute size cals:
110. {
111. statusdict/resolution known
112. {
113. % hwresolution (x only) is avail, so fetch it and calc absolute sizes:
114. /hwrx statusdict/resolution get def/hwry hwrx def
115. calcXYdims
116. }
117. {
118. %if languagelevel is 1, and no resolution entry, give up absolute size calcs:
119. /dpm xdots def/dpmY dpm def
120. %set xdim and ydim, by converting back from dots per module:
121. dpm dpmY idtransform /ydim exch abs def/xdim exch abs def
122. %init BWR to number of dots nearest to requested mil size (may be scaled):
123. /BWR STBarPringainadjX convPGAdots def
124. }
125. ifelse
126. }
127. % else languagelevel is 2 or greater, so fetch HWRes and calc absolute sizes:
128. {
129. %get printer dpi i X and Y directions (hwrx and hwry):
130. currentpagedevice /HWResolution get dup 0 get/hwrx exch def
    1 get/hwry exch def
131. calcXYdims
132. }
133. ifelse
134. %STBarBeginsSymDefs: (Code 128)
135. /leftQZ 10 xdim mul def
136. /rightQZ leftQZ def
137. /nSymchars 8 def
138. /nModules 11 nSymchars mul add def
139. /totalModules nModules leftQZ add def
140. /currXpos STBarXOrigin 0 snap pop def %will start by drawing left quiet zone
141. /currYpos 0 STBarHRVisible {STBarFontY STBarFontSize add} {STBarYOrigin} ifelse
142. snap exch pop def
143. /fontX currXpos left QZ add def %lef-align HR with first bar of bar code

TABLE 3-continued

144. /h nModules STBarHightRatio mul ydim mul currYpos add def
145. /startBar {newpath currXpos currYpos smoveto} bdef
146. /move1X {currentpoint pop xdim add currYpos slineto} bdef
147. /move1Xadj {currentpoint pop dup/leftpoint exch def
     a. xdim add BWR sub currYpos slineto} bdef
148. /finishBar {currentpoint pop h slineto currXpos h slineto
     closepath fill
     a. leftpoint xdim add currYpos smoveto/currXpos
     currentpoint pop def} bdef
149. /B1 {startBar move1Xadj finishBar} bdef
150. /B2 {startBar move1X move1Xadj finishBar} bdef
151. /B3 {startBar move1X move1X move1Xadj finishBar} bdef
152. /B4 {startBar move1X move1X move1X move1Xadj
     finishBar} bdef
153. /S1 {/currXpos currXpos xdim add 0 snap pop
     def currXpos currYpos smoveto}]bdef
154. /S2 {S1 S1} bdef
155. /S3 {S1 S1 S1} bdef
156. /S4 {S1 S1 S1 S1} bdef
157. /S10 {10 {S1} repeat} bdef
158. %STBarEndSymDefs
159. %STBarBeginDrawSym
160. S10
161. B2 S1 B1 S2 B3 S2
162. B1 S1 B2 S2 B3 S2
163. B1 S3 B1 S1 B2 S3
164. B3 S3 B1 S1 B2 S1
165. B2 S4 B1 S1 B1 S2
166. B2 S1 B4 S1 B2 S1
167. B1 S2 B4 S2 B1 S1
168. B2 S3 B3 S1 B1 S1 B2
169. S10
170. %STBarEndDrawSym
171. %STBarBeginDrawHR
172. %NOTE: tools need not generate this section if human-
     readable is disabled
173. %%IncludeFont: Courier
174. /Courier findfont STBarFontSize scalefont setfont fontX
     STBarFontY smoveto
175. STBarHRVisible {STBarHRstr show} if
176. %STBarEndDrawHR
177. %STBarBegin Trailer
178. end
179. grestore
180. showpage
181. %%EOP

TABLE 4

%!PS-Adobe-3.0 EPSF-3.0
%%Title: c128__1234567890d.eps
%%Creator: STBar V1.0
%%CreationDate:
%%BoundingBox: 0 0 80 20
%DocumentFonts: Courier
%DocumentNeededFonts: Courier
%%EndComments
%STBarBeginProlog
%the following section is always present and unchanged
in an STBar image:
gsave
/STBarDict 100 dict def STBarDict begin
%STBarBeginProcSet
%This section consists entirely of abbreviations and
procs using no variables
/bdef {bind def} bind def
/xad {exch abs def} bdef
/snap {transform .25 sub round .25 add exch .25 sub round .25 add
exch itransform} bdef
/smoveto {snap moveto} bdef
/slineto {snap lineto} bdef
% PROC pop1 - of top 2 inputs on stack, takes abs, pops the lesser of
the two
/pop1 convPGA - converts requested print gain adjustment, rounds
to fit dot pitch
%input: requested pga in mils; output: BWR, in dots

TABLE 4-continued

/convPGAdots { .0720 mul 0 dtransform abs round exch abs round exch
pop1 } bdef
% PROC convDDots - input: 1D delta coords (eg, [X, 0]), X of delta in
user space
/convDDots { idtransform pop1 } bdef
% PROC dots - input: dim, dotpitch; output: corresponding num of dots
(trunc'd)
/dots {1000 mul div truncate} bdef
% PROC calcXdots - input: Xdim in mils; output: corresponding # of dots
%          (truncated, not rounded); note: can be scaled by stretching
bounding box
/calcXdots { 0.0720 mul 0 dtransform pop1 truncate} bdef
% PROC calcYdots - input: Xdim in mils; output: corresponding
% of dots,
%          (truncated, not rounded); note: can be scaled by stretching
bounding box
/calcYdots { 0.0720 mul 0 exch dtransform pop1 truncate} bdef
%STBarEndProcSet
%STBarBeginDefaultGeneralVars
%This section initially defines the symbology-Independent vars;
%this section can only be changed by an Encoder:
/STBarXdim 10.0 def          % Requested X dimension, in mils
/STBarXdimRoundup            % percent of Xdim increase
1.05 def                     allowed, to match...
                             %... printer dot pitch rounding
                             upwards
/STBarLocked true def
/STBarMinX 6 def
/STBarMaxX 15 def/
%Requested bar width reduction for ink spread compensation:
/STBarPrintgainadjX 5 def    % (in mils)
/STBarMaxPGAX 0.7 def        % (max percent of X dimension
                             we'll shave)
/STBarHightRatio 0.15 def    % as a percentage of symbol's
                             length
/STBarXOrigin 1 def          % distance from left edge of bb,
                             in points
/STBarYOrigin 1 def          % distance from bottom of bb, if
                             no H.R.
%Human-Readable vars (defined regardless of whether HR is
currently enabled):
/STBarFontSize 8 def         % n-point front
/STBarFontY 1 def            % height, above bottom of box, to
                             draw H.R.
/STBarHRstr (1234567890) 55 string cvs def %this CANNOT
be changed by touch-up
/STBarHRVisible false def
%STBarEndDefaultGeneralVars
%STBarEndProlog
%STBarBeginGeneralVars
%the following are the symbology-independent variables that can
be touched up:
/STBarXdim 10.00             % Requested X dimension, in mils
/STBarXdimRoundup 1.05       % percent of Xdim increase
                             def allowed, to match...
                             %...printer
                             dot pitch rounding upwards
/STBarLocked false def
%Requested bar width reduction for ink spread compensation:
/STBarPrintgainadjX 3 def    % (in mils)
/STBarMaxPGAX 0.6            % (max percent of
def                          X dimension we'll shave)
/STBarHightRation 0.15 def   % as a percentage of symbol's
                             length
/STBarXOrigin 0 def          % distance from left edge of bb,
                             in points
/STBarYOrigin 0 def          % distance from bottom of bb,
                             if no H.R.
%Human-Readable vars (defined regardless of whether
HR is curently enabled):
/STBarFontSize 8 def         % n-point font
/STBarFontY 1 def            % height, above STBarYOrigin,
                             where h.r. is drawn
/STBarHRVisible true def     % if false, no room needed
                             for human readable

TABLE 4-continued

```
%STBarEndGeneralVars
%STBarBeginLocalProcs
% PROC convrtBWR - input: BWR in dots; output: BWR in usrspc
limited to Max:
/dpm 0 def
/convrtBWR {dup dpm STBarMaxPGAX mul gt
{pop dpm STBarMaxPGAX mul truncate} if 0 convDDots} bdef
% PROC remx - rescale matrix if needed, to keep X dim within bounds.
No stack IO
/sf 1 def /nef 1 def /dpm10 0 def /ox 0 def /nx 0 def
/dpm 0 def /dpmY 0 def /odpm 0 def /odpmY 0 def
/mxpc 1 def /mnpc 1 def /xrat 1 def /yrat 1 def /BWR 0 def
/dma 1 def /dmb 1 def /dmc 1 def /dmd 1 def /cma 1 def /cmb 1 def
/cmc 1 def /cmd 1 def
/remx {
/mxpc STBarMaxX STBarXdim div def /mnpc STBarMinX STBarXdim
div def /ox STBarXdim def
matrix defaultmatrix aload pop pop pop /dmd xad /dmc xad /dmb xad
/dma xad
matrix currentmatrix aload pop pop pop /cmd xad /cmc xad /cmb xad
/cma xad dma dmb gt
{/xrat cma cmb pop1 dma div def /yrat cmc cmd pop1 dmd div def}
{/xrat cma cmb pop1 dmb div def /yrat cmc cmd pop1 dmc div def}
ifelse
STBarLocked
{1 xrat div 1 yrat div scale
% allow some roundup of Requested Xdim to match printer dot pitch:
STBarXdimRoundup 1 gt { /STBarXdim STBarXdim
STBarXdimRoundup
mul def} if
%translate xdimension to dots/module, based on default userspace
scaling:
/dpm STBarXdim calcXdots def
/dpmY STBarXdim calcYdots def
/BWR STBarPrintgainadjX convPGAdots def
}
{
%1st, calc dpm for an unscaled 10 mil sym, so we can check it later:
1 xrat div 1 yrat div scale
/dpm10 1000.01 calcXdots 100 div def
xrat yrat scale
xrat mxpc gt
{/sf mxpc def}
{xrat mnpc 1t {/sf mnpc def} {/sf xrat def} ifelse}
ifelse
sf xrat div sf yrat div scale
% allow some roundup of Requested Xdim to match printer dot pitch:
STBarXdimRoundup 1 gt { /STBarXdim STBarXdim
STBarXdimRoundup mul def} if
/odpm STBarXdim calcXdots def /dpm odpm def
/odpmY STBarXdim calcYdots def /dpmY odpmY def
dpm dpm10 div sTBarMinX 10 div 1t
{/dpm dpm 1 add def}
/dpmY dpmY dup dpm div 1 mul round add def} if
/BWR STBarPrintgainadjX 10 div dpm10 mul round def
/nx dpm dpm10 div 10 mul def
/nsf nx ox div def
nsf sf div dup scle
}
ifelse
}
%STBarEndLocalProcs
%STBarBeginScript
0.0 setgray
%allow scaling within limits:
remx
%set xdim and ydim, by converting back (to user space) from dots
per module:
dpe dpmY idtransform /ydim xad /xdim xad
%convert BWR from dots to user space dimension,
%then make sure that requested BWR is no more than max pcnt BWR:
/BWR BWR convrtBWR def
/%STBarBeginSymDefs: (Code 128)
/leftQZ 10 xdim mul def
/rightQZ leftQZ def
/nSymchars 8 def
/nModules 11 nSymchars mul 2 add def
/totalModules nModules leftQZ add rightQZ add def
/currXpos STBarXOrigin 0 snap pop def %will start by drawing
left quiet zone
/currYpos 0 STBarHRVisible {STBarFontY STBarFontSize add}
{STBarYOrigin} ifelse
        snap exch pop def
/fontX currXpos leftQZ add def %left-align HR with first bar of
bar code
/h nModules STBarHightRatio mul ydim mul currYpos add def
/startBar {newpath currXpos currYpos smoveto} bdef
/move1X {currentpoint pop xdim add currYpos slineto} bdef
/move1Xadj {currentpoint pop dup/leftpoint exch def
        xdim add BWR sub currYpos slineto} bdef
/finishBar {currentpoint pop h slineto currXpos h slineto
closepath fill
        leftpoint xdim add currYpos smoveto/currXpos
currentpoint pop def} bdef
/B1 {startBar move1Xadj finishBar} bdef
/B2 {startBar move1X move1Xadj finishBar} bdef
/B3 {startBar move1X move1X move1Xadj finishBar} bdef
/Br {startBar move1X move1X move1X move1Xadj
finishBar} bdef
/S1 {/currXpos currXpos xdim add 0 snap pop
def currXpos currYpos smoveto}bdef
/S2 {S1 S1} bdef
/S3 {S1 S1 S1} bdef
/S4 {S1 S1 S1 S1} bdef
/S10 {10 {S1} repeat} bdef
%STBarEndSymDefs
%STBarBeginDrawSym
S10
B2 S1 B1 S2 B3 S2
B1 S1 B2 S2 B3 S2
B1 S3 B1 S1 B2 S3
B3 S3 B1 S1 B2 S1
B2 S4 B1 S1 B1 S2
B2 S1 B4 S1 B2 S1
B1 S2 B4 S2 B1 S1
B2 S3 B3 S1 B1 S1 B2
S10
%STBarEndDrawSym
%STBarBeginDrawHR
%NOTE: tools need not generate this section if human-
readable is disabled
%%IncludeFont: Courier
/Courier findfont STBarFontSize scalefont setfont fontX
STBarFontY smoveto
STBarHRVisible {STBarHRstr show} if
%STBarEndDrawHR
%STBarBegin Trailer
end
grestore
showpage
%%EOP
```

TABLE 5

```
%!PS-Adobe-3.0 EPSF-3.0
%%Title: (c128_1234567890)
%%Creator: (STBar V1.0)
%%Version: 1.1 1
%%Creation Date: ()
%%BoundingBox: 0 0 80 20
%%Pages: 1
%%DocumentData: Clean7Bit
%%DocumentProcessColors: Black
%%DocumentFonts: Courier
%%DocumentNeededFonts: Courier
%%EndComments
%%Prolog
%%EndProlog
%
%%BeginSetup
%
%STBarBeginProlog
```

TABLE 5-continued

```
%
gsave
/STBarDict 120 dict def STBarDict begin
%
%STBarBeginResource: procset STBarVarsGen 1.0 1
%
%STBarBeginDefaultGeneralVars
%This section initially defines the symbology-Independent vars;
%this section can only be changed by an Encoder:
/STBarEHR (1234567890) 55   % Exactly has human readable appears
string cvs def
/STBarTBBX 80 def           % x coord (pts) of upper right corner
                              of bounding box
/STBarTBBY 20 def           % y coord (pts) of upper right corner
                              of bounding box
/STBarTX 10.000 def         %Xdim(mils)
/STBarTR 10 def             %RoundUp (percept if Xdim increase
                              allowed to match printer dot pitch)
/STBarTLk true def          %Locked(if true, embedded eps is
                              "locked,"
/STBarEMnX 6.667 def        % min X dimension that TUT can
                              allow user to select
/STBarEMxX 15.000 def       % max X dimension that TUT can
                              allow user to select
/STBarTPgaX 2.000 def       %BWR (requested Print Gain Adjustment
                              (shaving), in mils)
/STBarEMPgaX 0.600 def      % max percent of X dimension we'll
                              allow to be shaved
%Human-Readable vars (defined regardless of whether HR is
currently enabled):
/STBarEFS 8 def             %Font Size (in points)
/STBarEFN (Courier) def     % Font Needed, if any, to draw H.R.
/STBarEFE ( ) def           % Font Embedded, if any, to draw H.R.
/STBarTHRV true def         %TextVisible (whether or not to display
                              human readable text)
%STBarEndDefaultGeneralVars
/STBarvcdg 5330 def
%
%STBarBeginGeneralVars: ( )
%the following are the symbology-independent variables that
can be touched up:
/STBarBBX 80 def
/STBarBBY 20 def
/STBarX 10.000 def
/STBarR 10 def
/STBarLk true def
/STBarPgaX 2.000 def
/STBarHRV true def
%STBarEndGeneralVars
/STBarvcg 5662 def
%
%STBarBeginProcsetVars
%General Variables, never accessed by touchup tool:
/sf 1 def/nsf 1 def/dpm10 0 def/ox 0 def/nx 0 def
/dpm 0 def/dpmY 0 def/odpm 0 def/odpmY 0 def/Pgas 1 def
/mxpc 1 def/mpc 1 def/xrat 1 def/yrat 1 def/BWR 0 def
/dma 1 def/dmb 1 def/dmc 1 def/dmd 1 def/cma 1
def/cmb 1 def/cmc 1 def/cmd 1 def
%currXpos. currYpos, ht (ypos of top of bar), xRoundedUp,
xdim, ydim, leftpoint, nogood:
/cx 0 def/cy 0 def/ht 0 def/xru 0 def/xd 0 def/yd 0 def/1pt
0 def/fbr true def
%fontX, fontY, Xorig, Yorig:
/fX 0 def/fY 0 def/xo 0 def/yo 0 def
%checksum, weight, ProgramChecksumGen:
/ck 0 def/wht 2 def/PCGen 0 def
%STBarEndProcsetVars
%
%STBarEndResource
%
%
%STBarBeginResource: proset STBarDefsGen 1.0 1
%
%PostScript abbreviations (for operators and common op sequences):
/1/def load def/bd{bind !}bind !/1d(load !}bd/x!{exch !}bd
/dt/dtransform 1d/idt/idtransform 1d/rd/round 1d/tr/truncate 1d/pp/pop 1d
/cpt/currentpoint 1d/ie/ifelse 1d
%
%Proc defs, for utility procs that use the stack, but reference no variables:
% PROC snap - takes (X,Y) in user space; returns (X,Y), snapped to
nearest dot:
/sn{transform .25 sub rd .25 add exch .25 sub rd .25 add exch
itransform}bd
% PROCs exch_abs_def, snap_moveto, and snap_lineto;
/xad{exch abs !}bd/sm{sn moveto}bd/sl{sn lineto}bd
% PROC pop1 - of top 2 inputs on stack, takes abs, pops the lesser
of the two
/p1{abs exch abs exch 2 copy 1t{exch pp} {pp}ie}bd
% PROC convPGAdots - converts requested print gain adjustment,
rounds to
fit dot pitch
%input: requested pga in mils; output; BWR, in dots
/cPGA{.0720 mul 0 dt abs rd exch abs rd exch p1}bd
% PROC convDDots - input: 1D delta coords (eg, [X,O]), output:
X of delta
in user space
/cDD{idt p1}bd
% PROC dots - input: dim, dotpitch; output: corresponding num of
dots (trunc'd)
/dots{1000 mul div tr}bd
% PROC calcXdots - input: Xdim in mils; output: corresponding # of
dots,
%       (trunc'd, not rounded); note: can be scaled by stretching bounding
           box
/cXD{0.0720 mul 0 dt p1 tr}bd
% PROC calcYdots - input: Xdim in mils; output: corresponding # of
dots,
%       (trunc'd, not rounded); note: can be scaled by stretching bounding
           box
/cYD{0.0720 mul 0 exch dt p1 tr}bd
%
% PROC booleantype, etc: redefine the return values of type,
to calc/chksums for each type:
/booleantype{{7}{3}ie}bd/stringtype{0 exch {add} forall}bd/realtype{10
mul rd cvi}bd/integertype { }bd
%
%This subsection contains general procs that use vars:
%
% PROC convrt BWR - input: BWR in dots; output: BWR in usrspc,
limited to Max:
/cBWR{dup dpm STBarEMPgaX mul gt
{dpm STBarEMPgaX mul tr}if Pgas add 0 cDD Pgas mul}bd
%
% PROC remx - rescale matrix if needed, to keep X dim within bounds.
No stack IO
/remx{
STBarPgaX 0 1t{/Pgas −1 !}if
/mxpc STBarEMxX STBarX div ! /mnpc STBarEMnX STBarX dif
! /ox STBarX !
matrix defaulmatrix aload pp pp pp /dmd xad /dmc xad /dmb xad /dma
xad
matrix currentmatrix aload pp pp pp /cmd xad /cmc xad /cmb xad
/cma xad
dma dmb gt
{/xrat cma cmb p1 dma div ! /yrat cmc cmd p1 dmd div !}
{/xrat cma cmb p1 dmb div ! /yrat cmc cmd p1 dmc div !}ie
% allow some roundup of Requested Xdim to match printer dot pitch:
/xru STBarX STBarR 100 div 1 andd mul !
% scale matix to get back to the system's default matrix:
1 xrat div 1 div scale
STBarLk
{
%translate xdimension to dots/module, based on default userspace scaling:
/dpm xru cXD !
/dmY xru cYD !
/BWR STBarPgaX cPGA !
}
{
%1st, calc dpm for an unscaled 10 mil sym, so we can check it later:
/dpm10 1000.01 cXD 100 div !
%
xrat mxpc gt{/sf mxpc !} {xrat mnpc 1t{/sf mnpc !} {/sf xrat !}ie}ie
%
/odpm xru sf mul cXD ! /dpm odpm !
/odpmY xru sf mul cYD ! /dpmY odpmY !
dpm dpm10 div STBarEMnX 10 div 1t
{/dpm dpm 1 add ! /dpmY dpmY dup dpm div 1 mul rd add !}if
/BWR STBarPgaX 10 div dpm10 mu1 rd !
```

TABLE 5-continued

```
/nx dpm dpm10 div mu1 ! /nsf nx ox div !
}ie dpm 2 1t{/fbr true !}if
}bd
%
% PROC checkOne: calc partial checksum on one name plus
its value (mult'd by its weight):
/ck1 {dup 0 exch {add} forall exch cvn load dup type exec
/wht wht 1 add ! wht mul add}bd
%
% PROC checkem: input: array of names on stack; output; calculated
value
/ckm{/ck 0 !/wht 2 !{ck1 ck add 9973 mod /ck x!} forall ck}bd
%
% PROC initGeneral: inits matrix, and inits vars (xdim, BWR,
etc) accordingly:
%(allows scaling within limits, if Locked if false)
%(sets xdim and ydim, by converting back (to user space) from dots
per module)
%(converts BWR from dots to user space dimensions,)
%(then make sure that requested BWR is no more than max pcnt BWR)
/iGen{0.0 setgray remx dpm dmpY idt /yd xad /xd xad /BWR BWR
cBWR !
[(STBarEHR) (STBarTBBX) (STBarTBBY) (STBarTX) (STBarTR)
(STBarTLk) (STBarEMnX) (STBarEMxX)
(STBarTPgaX) (STBarEMPgaX) (STBarEFS) (STBarEFN) (STBarEFE)
(STBarTHRV)] ckm STBarvcdg ne /fbr x!
[(STBarBBX) (STBarBBY) (STBarX) (STBarR) (STBarLk) (STBarPgaX)
(STBarHRV)] ckm STBarvcg ne fbr or /fbr x!
}bd
%
% PROCs to draw a bar: startBar, move1X, move1Xadj, finishBar:
/sb}newpath cx cy sm}bd
/m1x{cpt pp xd add cy s1}bd %
/m1xadj{cpt pp dup /1pt x!
         xd add BWR sub cy s1}bd
/fb{cpt pp ht s1 cx ht s1 closepath fill
         1 pt xd add cu sm /cx cpt pp !}bd
%
% PROCs for drawing bars and spaces of various widths:
/B1{sb m1xadj fb}bd
/B2{sb m1x m1xadj fb }bd
/B3{sb m1x m1x m1xadj fb }bd
/B4{sb m1x m1x m1xadj fb }bd
/S1{/cx cx xd add 0 sn pp ! cx cy sm}bd
/S2{S1 S1}bd
/S3{S1 S1 S1}bd
/S4{S1 S1 S1 S1}bd
/S10{10{S1}repeat}bd
%
% PROC cleanupGeneral: performs any needed postprocessing after
symbol is drawn:
% (on error, draw an X thru sym, 2pts in from corners of BB)
/cuGen{fbr{1 setlinewidth newpatch 2 2 sm STBarBBX 2 sub
STBarBBY 2 sub s1
    2 STBarBBy 2 sub sm STBarBBX 2 sub 2 s1 stroke}if}bd
%
%ProgramChecksumDefsGen:
/PCGen 24254 !
%
%STBarEndResource
%
%
%STBarBeginResource: procset STBarVarsSymCode128 1.0 1
%
%STBarBeginDefaultSymVars
%This section initially defines the symbology-Dependent vars;
%this section can only be changed by an Encoder:
/STBarTHightRation 0.15 def   %SymbolHeight (as a percentage
                                of symbol's length)
%STBarEndDefaultSymVars
/STBarvcd128 1545 def
%
%STBarBeginSymVars: ( )
%this section can be changed by a Touch Up Tool:
/STBarHightRatio 0.15 def
%STBarEndSymVars
/STBarvc128 1461 def
%
%STBarBeginSymProcsetVars
/leftQZ 0 !/rightQZ 0 !/nSymchars 0 !/nModules 0 !/total Modules 0 !
%ProgramChecksumDefsSym128:
/PC128 0 def
%STBarEndSymProcsetVars
%
%STBarEndResource
%
%
%STBarBeginResource: procset STBarDefsSymCode128 1.0 1
%
% PROC i128 calcs initial values, based on calc'd ydim, etc.
/i128}
[{STBarTHightRatio}] ckm STBarvcd128 ne fbr or /fbr x!
[{STBarHightRatio}] ckm STBarvc128 ne fbr or /fbr x!
/leftQZ 10 xd mu1 def
/rightQZ leftQZ def
/nSymchars 8 def
/nModules 11 nsymchars mul 2 add def
/totalModules nModules leftQZ add rightQZ add def
/cx xo 0 sn pp !
/fx cx leftQZ add ! /fY yo !
/cy   0 STBarHRV{fY STBarEFS 0.72 mu1 add} {yo}ie sn exch pp !
/ht nModules STBarHightRatio mu1 yd mu1 cy add !
}bd
%
% PROC showHumanReadable128:
/sHR128{STBarEFN cvn findfont STBarEFS scalefont setfont fX
fY sm STBarEHR show}bd
%
%ProgramChecksumDefsSym128:
/PC128 9739 !
%
%STbarEndResource
%
%
%STBarEndProlog
%
%STBarBeginScript
%
iGen
%
%STBarBeginDrawSym
%
i128
%
S10
B2 S1 B1 S2 B3 S2
B1 S1 B2 S2 B3 S2
B1 S3 B1 S1 B2 S3
B3 S3 B1 S1 B2 S1
B2 S4 B1 S1 B1 S2
B2 S1 B4 S1 B2 S1
B1 S2 B4 S2 B1 S1
B2 S3 B3 S1 B1 S1 B2
S10
%STBarBeginDrawHR
%NOTE: tools MUST delete next line if human-readable is disabled
%%IncludeFont: Courier
STBarHRV{sHR128}if
%STBarEndDrawHR
%STBarEndDrawSym
%
%STBarBeginTrailer
cuGen
end
grestore
showpage
%%Trailer
%%EOF
```

What is claimed is:

1. A method for producing a digital image of a machine readable optical code symbol having areas of different spectral characteristics and which is printable on differing printers having differing dot pitches, comprising the steps of:

selecting a desired nominal unit dimension for each area of the optical code symbol;

defining a resulting nominal unit dimension for each area as a function of the dot pitch of a target printer; and providing a vector representation of the optical code symbol using the resulting nominal unit dimension.

2. The method according to claim 1, wherein the optical code symbol is a bar code having bars and spaces of varying widths.

3. The method according to claim 2, wherein the bar code is an n,k bar code and wherein the nominal unit dimension is a module width.

4. The method according to claim 3, wherein the n,k bar code is an 11,3 bar code wherein the bars and spaces are from 1 to 4 modules in length.

5. The method according to claim 1, wherein the code symbol is a two-dimensional code symbol.

6. The method according to claim 5, wherein the two-dimensional code symbol is an n,k bar code and wherein the nominal unit dimension is at least one of the X dimension and the Y dimension.

7. The method according to claim 6, wherein the bar code is PDF417.

8. The method according to claim 1, further comprising the steps of:

selecting a desired nominal starting position for each successive area of the optical code symbol;

defining a resulting nominal starting position for each successive area as a function of the dot pitch of a target printer; and providing a vector representation of the optical code symbol using the resulting nominal unit dimension and the resulting nominal starting positions.

9. A method for producing a digital image of a machine readable optical code symbol having areas of different spectral characteristics and which is printable on differing printers having differing dot pitches, comprising the steps of:

selecting a desired nominal starting position for each successive area of the optical code symbol;

defining a resulting nominal starting position for each successive area as a function of the dot pitch of a target printer; and providing a vector representation of the optical code symbol using the resulting nominal starting positions.

10. The method according to claim 9, wherein the optical code symbol is a bar code having bars and spaces of varying widths.

11. The method according to claim 10, wherein the bar code is an n,k bar code and wherein the nominal unit dimension is a module width.

12. The method according to claim 11, wherein the n,k bar code is an 11,3 bar code wherein the bars and spaces are from 1 to 4 modules in length.

13. The method according to claim 9, wherein the code symbol is a two-dimensional code symbol.

14. The method according to claim 13, wherein the two-dimensional code symbol is an n,k bar code and wherein the nominal unit dimension is at least one of the X dimension and the Y dimension.

15. The method according to claim 14, wherein the bar code is PDF417.

16. A method for representing a digital image of a machine readable optical code symbol comprising at least one graphical element selected from a set of graphical elements, the symbol having a specified unit width in a first dimension, and which is printable on differing printers having differing dot pitches, comprising the steps of:

adjusting the specified unit width to fit an exact number of printed dots on a target printer;

providing a vector representation of each graphical element in the set using multiples of the adjusted unit width; and specifying the symbol as a series of references to the vector representations that correspond to the least one graphical element that defines the symbol.

17. The method of claim 16, wherein the step of adjusting comprises adjusting the specified unit width to a nearest smaller number of dots.

18. The method of claim 16, wherein the optical code symbol is a bar code and the graphical elements comprise bars and spaces.

19. The method of claim 18, wherein the graphical elements have respective widths along the first dimension that are integral multiples of a module width.

20. The method of claim 19, wherein the set of graphical elements comprises bars 1, 2, 3, and 4 modules wide and spaces 1, 2, 3, and 4 modules wide.

21. The method of claim 16, wherein each vector representation starting at a relative drawing point, wherein after the respective graphical element is drawn, the relative drawing point is repositioned on a unit width boundary.

22. The method of claim 21, wherein the vector representation shifts at least one edge of the graphical element by a specified number of dots in the first dimension in accordance with an ink-spread compensation parameter.

23. The method of claim 16, wherein the step of adjusting comprises the step of:

determining a printer dot pitch in the first dimension;

dividing the specified unit width by the dot pitch to determine a number of printed dots needed to fill the unit width;

truncating the number of printed dots to an integral number of dots; and multiplying the truncated number by the dot pitch to determine the adjusted unit width.

24. The method of claim 16, further comprising the step of restricting the adjusted unit width to within at least one of a minimum and maximum unit width.

25. The method of claim 16, further comprising the steps of:

detecting if a scale of the image has been changed from a default scale; and overriding the changed scale if a scale-lock setting is on.

26. The method of claim 25, further comprising the step of permitting scaling of the image within predefined limits if the scale-lock setting is off.

27. A computer image file representing an image of a machine readable optical code symbol comprising at least one graphical element selected from a set of graphical elements, the symbol having a specified unit width in a first dimension and being printable on differing printers having differing dot pitches, the image file comprising instructions which can be processed by a raster image processor to generate a rasterized version of the symbol, the instructions comprising:

a first portion comprising instructions to adjust the specified unit width to fit an exact number of printed dots on a target printer;

a second portion comprising vector representations of each graphical element in the set using multiples of the adjusted unit width; and a third portion comprising a series of references to the vector representations, the references corresponding to the graphical elements that define the symbol.

28. The image file of claim 27, wherein the first portion contains instructions to adjust the specified unit width to a nearest smaller number of dots.

29. The image file of claim 27, wherein the optical code symbol is a bar code and the graphical elements comprise bars and spaces.

30. The image file of claim 29, wherein the graphical elements have respective widths along the first dimension that are integral multiples of a module width.

31. The image file of claim 30, wherein the second portion defines vector representations of bars 1, 2, 3, and 4 modules wide and spaces 1, 2, 3, and 4 modules wide.

32. The image file of claim 27, wherein each vector representation starts at a relative drawing point and, wherein after the respective graphical element is drawn, the relative drawing point is repositioned on a unit width boundary.

33. The image file of claim 32, wherein each vector representation is configured to shift at least one edge of the graphical element by a specified number of dots in the first dimension in accordance with an ink-spread compensation parameter.

34. The image file of claim 27, wherein the a first portion contains instructions to:
- determine a printer dot pitch in the first dimension;
- divide the specified unit width by the dot pitch to determine a number of printed dots needed to fill the unit width;
- truncate the number of printed dots to an integral number of dots; and
- multiply the truncated number by the dot pitch to determine the adjusted unit width.

35. The image file of claim 27, wherein the first portion further contains instructions to restrict the adjusted unit width to within at least one of a minimum and maximum unit width.

36. The image file of claim 27, the instructions further comprising:
- a fourth portion containing instructions to detect if a scale of the image has been changed from a default scale and override the changed scale if a scale-lock setting is on.

37. The image file of claim 36, wherein the fourth portion further comprises instructions to permit scaling of the image within predefined limits if the scale-lock setting is off.

38. The image file of claim 27, wherein the instructions are in PostScript format.

39. An electronic document having the image file of claim 27 embedded therein.

40. The image file of claim 27, further comprising at least one of:
- a parameter specifying an amount of unprinted border area to leave adjacent to the symbol when printed;
- a parameter indicating whether the image file can be rescaled after being embedded in an electronic document;
- a parameter indicating an amount of print gain adjustment to be applied to compensate for ink spread;
- a parameter indicating whether to print human-readable text corresponding to data encoded by the symbol; and
- a parameter indicating a height at which the graphical elements should be printed.

* * * * *